United States Patent
Doers et al.

(10) Patent No.: US 10,458,307 B2
(45) Date of Patent: Oct. 29, 2019

(54) TWO-CYCLE DIESEL ENGINE CONFIGURED FOR OPERATION WITH HIGH TEMPERATURE COMBUSTION CHAMBER SURFACES

(71) Applicant: DeltaHawk Engines, Inc., Racine, WI (US)

(72) Inventors: Douglas A. Doers, Franklin, WI (US); Robert A. Greco, Racine, WI (US); Paul Olesen, Franklin, WI (US); Dennis Raymond Webb, Franksville, WI (US)

(73) Assignee: DeltaHawk Engines, Inc., Franklin, WI (US)

( * ) Notice: Subject to any disclaimer, the term of this patent is extended or adjusted under 35 U.S.C. 154(b) by 0 days.

(21) Appl. No.: 16/224,281

(22) Filed: Dec. 18, 2018

(65) Prior Publication Data
US 2019/0120117 A1    Apr. 25, 2019

Related U.S. Application Data

(63) Continuation of application No. PCT/US2016/039853, filed on Jun. 28, 2016.

(51) Int. Cl.
*F01P 3/02*    (2006.01)
*F02B 9/02*    (2006.01)
(Continued)

(52) U.S. Cl.
CPC ...... *F01P 3/02* (2013.01); *F02B 9/02* (2013.01); *F02B 23/0627* (2013.01);
(Continued)

(58) Field of Classification Search
CPC ........ F02B 9/02; F02B 23/0627; F02B 33/04; F02B 37/04; F01P 3/02
See application file for complete search history.

(56) References Cited

U.S. PATENT DOCUMENTS 2,374,190 A * 4/1945 Gernandt ............... F01L 7/08
                                                          123/190.14
4,736,716 A * 4/1988 Ohyama ............... F01P 3/02
                                                          123/41.78

(Continued)

FOREIGN PATENT DOCUMENTS

WO    WO2009007878    1/2009

OTHER PUBLICATIONS

International Searching Authority, "International Search Report and Written Opinion," issued in connection with International Application No. PCT/US2016/039853, dated Mar. 17, 2017, 10 pages.

*Primary Examiner* — Kevin A Lathers
(74) *Attorney, Agent, or Firm* — Reinhart Boerner Van Deuren s.c.

(57) ABSTRACT

A 2-cycle, direct-injection diesel engine configured to accommodate low cetane diesel and jet fuels. The engine includes combustion chambers having surfaces which are operable at high temperatures during engine operation to increase the combustion rate of low cetane fuels. The engine is further configured to reduce starting times in cold and/or low pressure situations such as those experienced during attempts to restart a plane engine at relatively high altitudes.

20 Claims, 14 Drawing Sheets

(51) Int. Cl.

| | |
|---|---|
| *F02B 23/06* | (2006.01) |
| *F02B 33/34* | (2006.01) |
| *F02B 37/04* | (2006.01) |
| *F02B 75/02* | (2006.01) |
| *F02F 1/00* | (2006.01) |
| *F02F 3/00* | (2006.01) |
| *F02B 1/12* | (2006.01) |
| *F02B 33/02* | (2006.01) |
| *F02B 37/00* | (2006.01) |
| *F02B 61/04* | (2006.01) |

(52) U.S. Cl.
CPC .............. *F02B 33/34* (2013.01); *F02B 37/04* (2013.01); *F02B 75/02* (2013.01); *F02F 1/004* (2013.01); *F02F 3/0084* (2013.01); *F02B 1/12* (2013.01); *F02B 33/02* (2013.01); *F02B 37/00* (2013.01); *F02B 61/04* (2013.01); *F02B 2075/025* (2013.01); *F02B 2201/02* (2013.01); *F02B 2700/03* (2013.01); *F05C 2201/021* (2013.01)

(56) References Cited

U.S. PATENT DOCUMENTS

| | | |
|---|---|---|
| 5,878,703 A | 3/1999 | Sweeney |
| 6,318,243 B1 * | 11/2001 | Jones .................... F02F 3/0015 92/189 |
| 2005/0235946 A1 | 10/2005 | Doers et al. |
| 2008/0257321 A1 | 10/2008 | Knaus et al. |
| 2015/0219030 A1 | 8/2015 | Naik |

\* cited by examiner

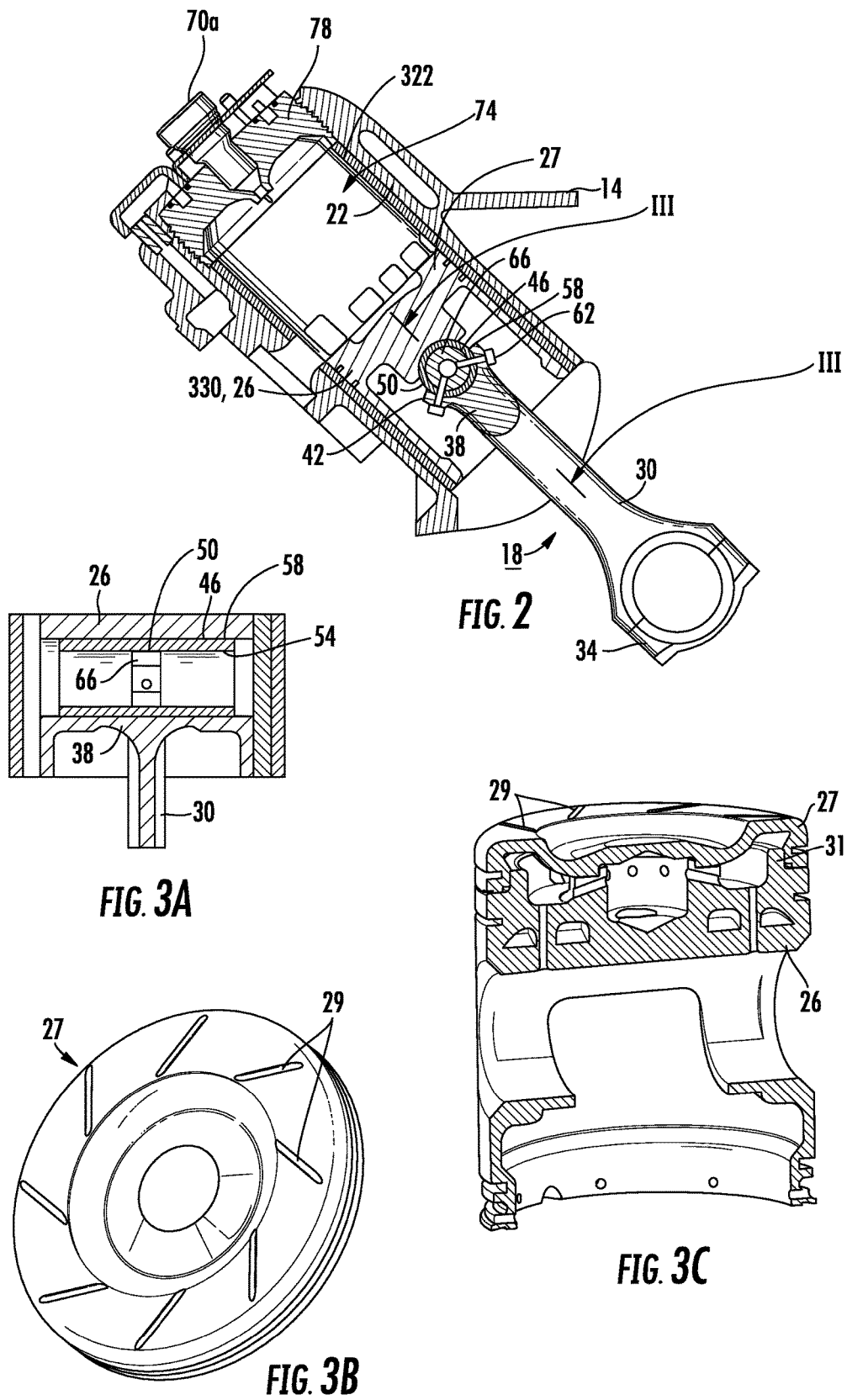

TWO-CYCLE DIESEL ENGINE CONFIGURED FOR OPERATION WITH HIGH TEMPERATURE COMBUSTION CHAMBER SURFACES

CROSS-REFERENCE TO RELATED PATENT APPLICATION

This application is a continuation of International Application No. PCT/US2016/039853, filed on Jun. 28, 2016, which is incorporated herein by reference in its entirety.

BACKGROUND OF THE INVENTION

The present invention generally relates to a two-cycle, diesel engine. In particular, the invention relates to a novel, diesel engine configuration permitting operation of the engine with combustion chamber surface temperatures which allow the engine to properly function while using diesel fuels having a range of cetane (also referred to as hexadecane) levels. The engine configuration also permits restarting of the engine at low atmospheric pressures of the type experience when using the engine for aviation applications.

SUMMARY OF THE INVENTION

One embodiment of the invention relates to a two-cycle diesel engine for operating with high combustion chamber surface temperatures. The engine includes an aluminum engine block including at least one cylinder including a first intake port and a first exhaust port. The engine block including a first fluid flow channel for cooling the engine block and a second fluid flow channel located at the exhaust port to cool the portion of the cylinder proximate the exhaust port. The engine also includes a cylinder sleeve having a top end and a bottom end, and fabricated from a metal composite to include a second intake port and a second exhaust port proximate the bottom end. The sleeve being fastened to the interior of the cylinder with the intake ports being in fluid communication and the exhaust ports being in fluid communication. The engine also includes a head assembly engaged with the engine block, the head assembly including a third cooling fluid flow channel. The engine also includes a fuel injector assembly including an injector tip. The assembly is supported by the head assembly. The injector assembly including a fuel flow channel between a fuel source and the injector tip, a return fuel channel between the injector tip and the fuel source and a cooling fuel channel between the injector tip and the fuel source. The engine also includes a stainless steel fire plate resiliently supported between the top end of the cylinder sleeve and the head assembly to cooperate with the fuel injector assembly to close the top end of the cylinder sleeve. The engine also includes a crank shaft coupled to a connecting rod. The engine also includes an aluminum piston having a titanium alloy crown, the piston being located within the sleeve. The piston connected to the connecting rod to move the crown between the top of the cylinder sleeve, and below the second intake and exhaust ports. The engine also includes a turbocharger including a turbine coupled to the exhaust ports and a compressor. The compressor including an input coupled to an air filter and an output. The engine also includes a supercharger including a compressor coupled to the compressor output and the intake ports.

Another embodiment of the Invention relates to a two-cycle diesel engine for operating with high combustion chamber surface temperatures. The engine includes an aluminum engine block including at least four cylinders each including a first intake port and a first exhaust port. The engine block including a first fluid flow channel for cooling the engine block and a second fluid flow channel located at the exhaust ports to cool the portions of the cylinders proximate the exhaust ports. The engine also includes at least four cylinder sleeves each having a top end and a bottom end. The cylinder sleeves fabricated from a metal composite to each include a second intake port and a second exhaust port proximate the bottom ends. The sleeves being fastened to the interior of a respective cylinder with the intake ports being in fluid communication and the exhaust ports being in fluid communication. The engine also includes at least four head assemblies engaged with the engine block, the head assemblies each including a third cooling fluid flow channel. The engine also includes at least four fuel injector assemblies each including an injector tip. The assemblies are each supported by a respective head assembly. The injector assemblies each including a fuel flow channel between a fuel source and the injector tip, a return fuel channel between the injector tip and the fuel source and a cooling fuel channel between the injector tip and the fuel source. The engine also includes at least four stainless steel fire plates. Each of the fire plates is resiliently supported between the top end of respective cylinder sleeves and the head assemblies to cooperate with the fuel injector assembly to close the top end of a respective cylinder sleeve. The engine also includes a crank shaft coupled to at least four connecting rods. The engine also includes at least four aluminum pistons each having a titanium alloy crown. The pistons are located within a respective sleeve and connected to a respective connecting rod to move the crown between the top of the cylinder sleeve, and below the second intake and exhaust ports. The engine also includes a turbocharger including a turbine coupled to at least one of the exhaust ports. The turbocharger also includes a compressor including an input coupled to an air filter and an output. The engine also includes a supercharger including a compressor coupled to the output and at least one of the intake ports.

Another embodiment of the invention relates to an engine unit. The engine unit includes an engine block including at least one cylinder. The at least one cylinder includes a first intake port and a first exhaust port. The engine block includes a first fluid flow channel for cooling the engine block and a second fluid flow channel located at the exhaust port to cool the portion of the cylinder proximate the exhaust port. The second fluid flow channel includes a first branch passing over the top portion of the first exhaust port and a second branch passing under the bottom portion of the first exhaust port. The engine unit also includes a cylinder sleeve having a top end and a bottom end. The top and bottom end fabricated from a metal composite to include a second intake port and a second exhaust port proximate the bottom end. The sleeve is fastened to the interior of the cylinder with the intake ports being in fluid communication and the exhaust ports being in fluid communication. The engine unit also includes a head assembly engaged with the engine block. The head assembly includes threads for engaging the head to the engine block and including a third cooling fluid flow channel. The engine unit also includes a fuel injector assembly including an injector tip. The assembly is supported by the head assembly. The injector assembly includes a fuel flow channel between a fuel source and the injector tip, a return fuel channel between the injector tip and the fuel source and a cooling fuel channel between the injector tip and the fuel source. The engine unit also includes a stainless steel fire plate. The engine unit also includes a deflected belleville washer. The belleville washer is located between the head assembly and the stainless steel fire plate. The engine unit also includes a sealing washer. The sealing washer is located between the stainless steel fire plate and the top end of the cylinder sleeve. The sealing washer, fire plate and fuel injector assembly are arranged to close the top end of the cylinder sleeve. The engine unit also includes a crank shaft coupled to a connecting rod. The engine unit also includes an aluminum piston having a titanium alloy crown. The piston is located within the sleeve and connected to the connecting rod to move the crown between the top of the cylinder sleeve, and below the second intake and exhaust ports. The engine unit also includes a wrist pin supported at its ends and center by the piston. The end of the connecting rod includes a saddle which surrounds less than 180 degrees of the wrist pin and is fastened to the wrist pin. The engine unit also includes a turbocharger including a turbine coupled to the exhaust ports and a compressor including an input coupled to an air filter and an output. The engine unit also includes a supercharger including a compressor coupled to the compressor output and the intake ports.

Alternative example embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 2 is a sectional view taken along line II-II illustrating a cylinder head, a cylinder, a piston and a connecting rod of the engine of FIG. 1.

FIG. 3a is a cross-sectional view taken along line III-III of FIG. 2.

FIG. 3b is a top perspective view of a crown the piston of FIG. 2

FIG. 3c is a perspective cross-sectional view of the piston and crown of FIG. 2

FIG. 5 is also an enlarged view of a portion of FIG. 2 illustrating in greater detail the cylinder, the cylinder head, the fuel injector and the cooling cap.

DETAILED DESCRIPTION

The engine configuration discussed in detail below uses various combinations of engine component configurations and materials which permit operation of an engine using combustion temperatures which allow the engine to properly function while using diesel fuels of varying cetane content. Of particular concern are diesel fuels with low cetane levels. For example, the ASTM D1655 standard for Jet A type fuel does not control for cetane levels, which results in high cetane variation amongst different sources of the same Jet A fuel type. The cetane number is an indicator of the combustion speed of diesel fuel as typically measured by the time period between the start of injection and the first identifiable pressure increase during combustion of the diesel fuel. Higher cetane fuels will have shorter ignition delay periods than lower cetane fuels. By way of reference, the characteristic diesel "knock" occurs when fuel that has been injected into the cylinder ignites after a delay causing a late shock wave. Minimizing this delay results in less unburned fuel in the cylinder and less intense knock. Therefore higher-cetane fuel usually causes an engine to run more smoothly and quietly.

Generally, diesel engines operate well using diesel fuel having a cetane number between 40 to 55. In Europe, diesel cetane numbers were set at a minimum of 38 in 1994 and 40 in 2000. The current minimum in the EU is a cetane number of 51. In North America, most states have adopted a minimum cetane number for diesel fuel of 40, with typical values in the 42-45 range. By way of further example, California requires that diesel fuel have a minimum cetane of 53.

One embodiment of the engine is configured for use as an aircraft engine. When used in aircraft, the diesel fuels available at various airports will vary and may have cetane levels which are low enough to produce poor engine performance. However, the ignition delays caused by low cetane levels can, within a range, be compensated for by increasing the combustion temperatures of a diesel engine. However, increasing the combustion surface temperature to a level effective to produce such compensation is not merely a matter of just allowing an engine to run hotter. Rather, the increased temperature requires an engine which is configured to provide proper heat removal from the engine while permitting increased localized temperatures in a combustion chamber configured to operate at higher temperatures and configured to cause mixing and movement/flow of a fuel-air mixture to improve ignition at a given temperature. The novel engine configuration disclosed herein provides for a two-cycle diesel engine which can properly function at cetane levels as low as 28.

Figure 1:
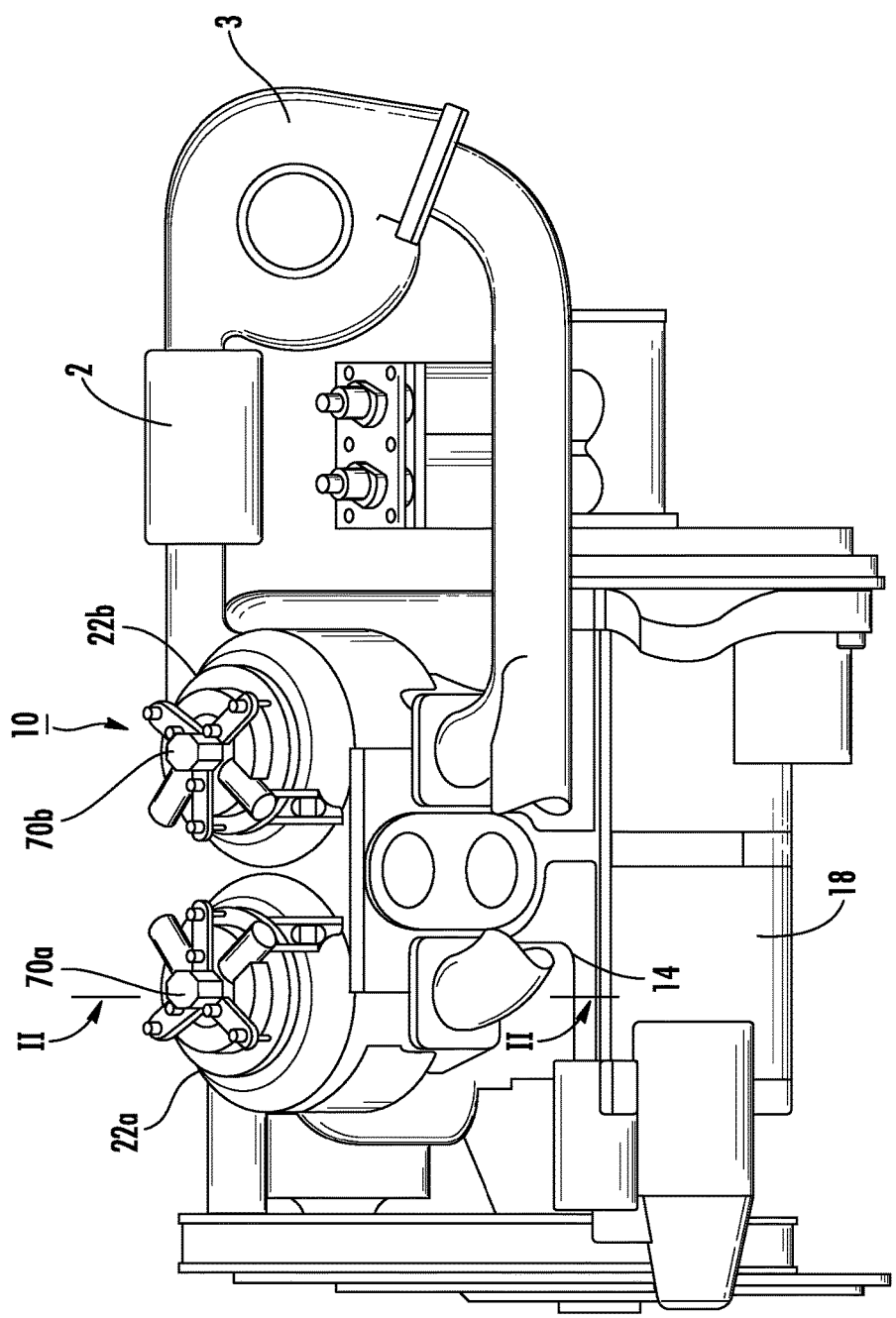
FIG. 1 is an elevational view of an internal combustion engine in which the present invention is employed.

Illustrated in FIG. 1 is an internal combustion engine 10. The engine 10 is a two-stroke, diesel engine having four cylinders 22 in a V-type arrangement operable to drive a propeller 411 (see FIG. 20). Engine 10 (and version 310 discussed further below) generally is a four cylinder engine wherein diesel fuel is direct injected directly at the top and center of each cylinder. One structural feature of engine 10, which permits this direct injection, is that engine 10 does not include either exhaust or intake valves. Rather, intake and exhaust ports are located in the cylinder and sleeve walls so that engine 10 exhausts and intakes fresh combustion air when the piston 26, 330 is at or near the bottom of its stroke. To improve performance and efficiency of engine 10, a supercharger 1, an intercooler 2 and a turbocharger 3 are used (shown schematically in FIGS. 1 and 9). In particular, the turbocharger 3 is coupled to the exhaust ports and powered by the exhaust energy from the cylinders. The supercharger 1 is located between the cylinders 22 and is coupled between the input ports of engine 10 to further pressurize the fresh air entering the cylinders of engine 10 during operation. Intercooler 2 is coupled to the output of turbocharger 3 and the input of supercharger 1. In addition to improving engine performance, the addition of supercharger 1 in combination with turbocharger 3 and intercooler 2 reduces the time for engine starting and restarting. In one embodiment, the supercharger 1 starts the flow of gas in engine 10 and spools up turbocharger 3, which lessens the amount of work required of supercharger 1. By way of specific example, for aircraft applications, engines may need to be restarted during flight. In this situation, short restart times are desirable. Ideally, restart times are shorter than the time it takes for a plane to make an unintended landing.

Referring to FIG. 2, engine block 14 at least partially defines a crankcase 18 and two sets of two cylinders (only two of the cylinders 22 are shown in FIG. 1 and are labeled 22a and 22b. Unless a description requires specific reference to a particular cylinder, the cylinders will be referred to only with reference numeral "22"). The four cylinders 22 are generally identical, and only one cylinder will be described in detail. A crankshaft (not shown) is rotatably supported within the crankcase 18 by pressure lubricated bearings. A piston 26 reciprocates in the cylinder 22 and is connected to the crankshaft via connecting rod 30. As the piston 26 reciprocates within the cylinder 22, the crankshaft rotates.

The connecting rod 30 includes a first end 34 which is connected to the crankshaft. The connecting rod 30 further includes a second end 38 which includes an arcuate portion 42 that does not completely encircle a wrist pin 46. Preferably, the arcuate portion 42 of the connecting rod 30 has an arcuate extent that is about or slightly less than 180 degrees. The wrist pin 46 has an annular wall 50 including a cylindrical inner surface 54 (FIG. 3a) and a cylindrical outer surface 58, which engages the arcuate portion 42 of the connecting rod 30, and is pivotally connected to the piston 26. A plurality of fasteners 62 extend through the annular wall 50 of the wrist pin 46 and into a wrist pin insert 66 (see also, FIG. 3a) to secure the wrist pin 46 to the arcuate portion 42 of the connecting rod 30. Preferably, the wrist pin insert 66 is cylindrical or trunnion type wrist pin. Using a trunnion type wrist pin increases the available bearing area. Preferably, the fasteners 62 are screws and thread into the wrist pin insert. This connecting rod arrangement permits the top portion of the piston to have more uniformity than a connecting rod arrangement wherein end 38 surrounds the wrist pin 46. In the arrangement where end 38 surrounds the associated wrist pin 38, material is removed from the top portion of the piston 26. The removed material changes the deformation characteristics of the piston 26 when it is heated and cooled during engine operation either during transient periods or as the engine cycles through its diesel combustion cycle.

Additionally, as shown in FIG. 3a, where the upper or second end 38 of the connecting rod 30 does not encircle the wrist pin 46, the piston 26 bears against the wrist pin 46 along the entire top of the wrist pin 46, thereby more evenly distributing the load on the wrist pin 46. The use of the wrist pin insert 66 further increases the strength and stability of the wrist pin 46. The forced rocking of the wrist pin 46 as the connecting rod 30 pivots and the increased bearing surface area of the wrist pin 46 minimizes uneven wear on the bearing surface of wrist pin 46 during operation of the engine 10.

Referring now more specifically to the top of piston 26, FIG. 3b is a top perspective view of a crown 27 of piston 26 and FIG. 3c is a perspective cross-sectional view of the piston showing the configuration of crown 27. In particular, crown 27 includes the arcuate grooves 29. Grooves 29 cause improved mixing of the fuel air mixture during the initial combustion of the mixture which increases the combustion speed for fuel having a given cetane level. When combined with the other structural features of engine 10, grooves 29 improve the performance of engine 10 when burning low cetane diesel fuels.

As generally discussed above, engine performance for fuels having a given cetane level is also improved if the surface temperatures of the surfaces defining the interior combustion chamber (generally referenced as 74 in FIGS. 2, 5, 12 and 14, and as 350 in FIG. 10) are maintained sufficiently high. Accordingly, these surfaces must be fabricated or formed from materials which are suitable for use in an engine at high operating temperatures. The first of these surfaces is the top surface of crown 27. A suitable material for use in fabricating crown 27 is a titanium metal. By way of specific example, for the engine 10 as disclosed herein it is desirable to use a titanium compound such as Ti 6Al-4V. This example alloy by weight percentage includes Carbon (maximum 0.10%), Aluminum (5.50 to 6.75%), Vanadium (3.50 to 4.50%), Nitrogen (approximately 0.05%), Iron (maximum 0.40%), Oxygen (maximum 0.020%), Hydrogen (maximum 0.015%), Other (maximum 0.40%), and balance Titanium.

The groves 29 are formed into the top of crown 27. In one embodiment, a ball end mill is used to cut out groves 29. The crown 27 is joined to skirt 31 of piston 26. In one embodiment, threads are formed on the interior of crown 27 that are configured to mate with threads formed on skirt 31. Crown 27 is further staked at three different locations. Accordingly, the shape of and material used for crown 27 provide one of the surfaces which define the interior of combustion chamber 74. This surface is designed to both improve fuel air mixing and be useable at a surface temperature which is suitable for burning lower cetane fuels.

Figure 4:
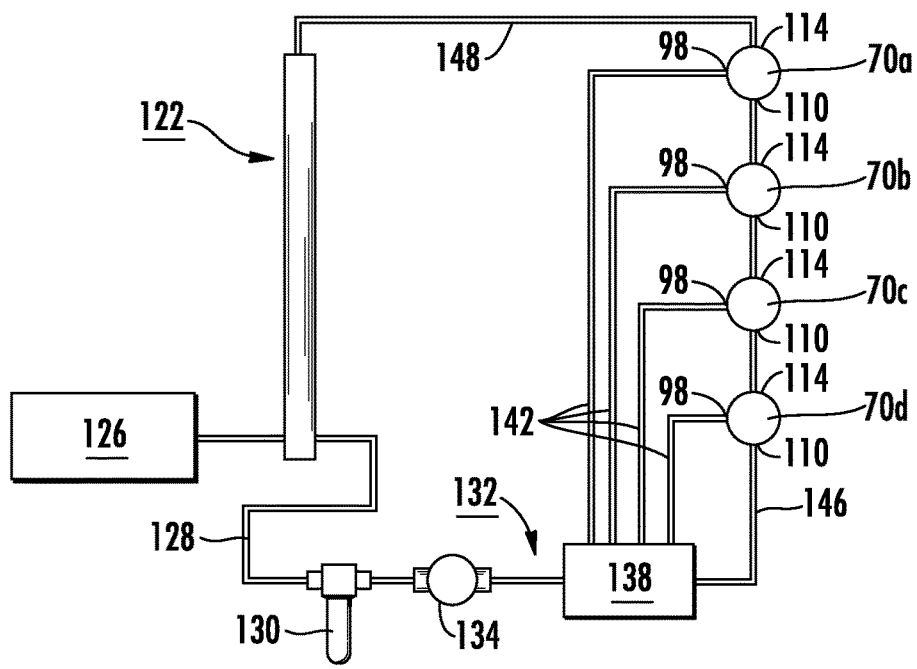
FIG. 4 is a schematic of a fuel injection system for the engine of FIG. 1.
Figure 5:
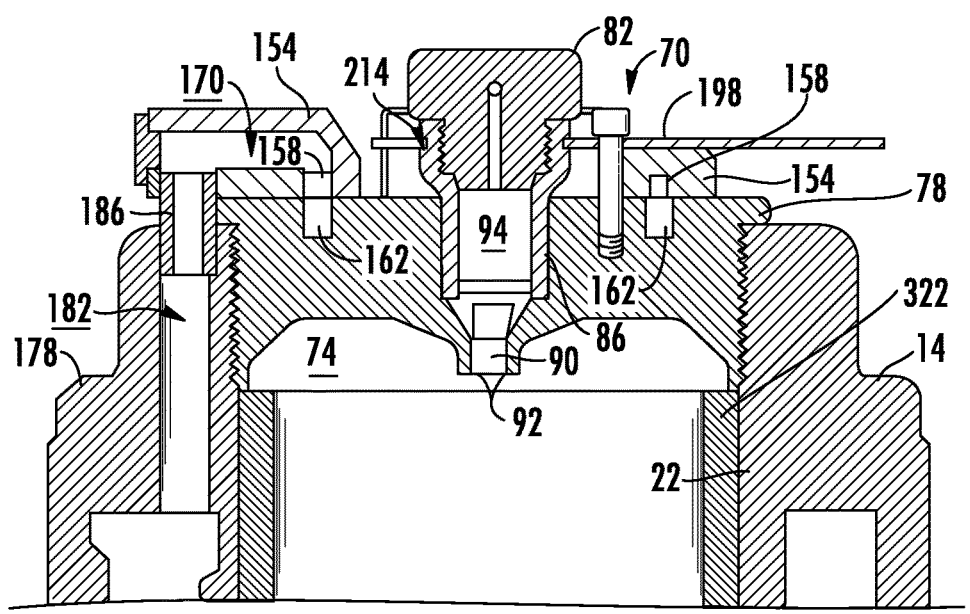
FIG. 5 is a cross-sectional view taken along line VII-VII of FIG. 8.

Referring to FIG. 4, engine 10 includes four fuel injectors 70a, 70b, 70c and 70d, one for each cylinder 22. (Unless a description requires specific reference to a particular fuel injector, fuel injectors will be referred to only with reference numeral "70.") Fuel injectors 70 are substantially identical to each other, and only one will be described in detail. Referring generally to FIG. 5, fuel injector 70, is located to inject fuel into a combustion chamber 74 which has an internal surface defined by the surfaces of piston crown 27, a cylinder sleeve 322, and fire plate 338. The fuel injector 70 includes a fuel injector nut 86 which is received by an appropriately sized tapered bore in a cylinder head 78. Inside the injector nut 86 is a fuel injector tip 90 housing a pressure responsive, movable pintle (not shown). The nut 86 and the tip 90 define a main fuel outlet 92 communicating with the combustion chamber 74. A fuel injector body 82 is threaded into the upper end of the nut 86.

Figure 6:
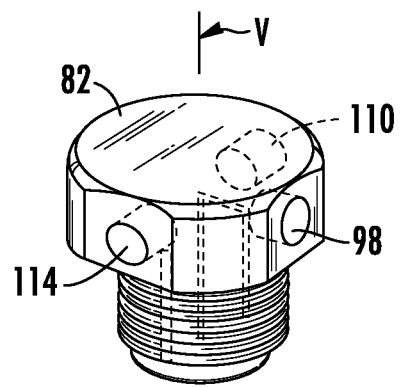
FIG. 6 is a perspective view of a fuel injector body of the engine of FIG. 1.
Figure 7:
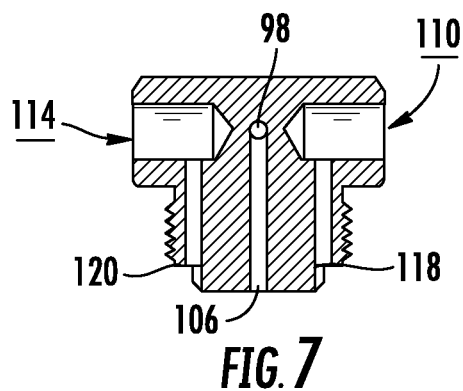
FIG. 7 is a cross-sectional view taken along line V-V of FIG. 6.

Referring to FIGS. 6 and 7, the fuel injector body 82 includes a main fuel inlet port 98 which communicates with and transitions into fuel passage 106. A fuel inlet cooling port 110 communicates with and transitions into a cooling port 118. An injector overflow fuel outlet port 114 communicates with and transitions into outlet port 120. Although not shown, the fuel injector further includes a flow straightener, a check valve, a check valve receiver, a spring mechanism and a spring guide, all of which are positioned within a hollow space 94 of the fuel injector nut 86 between the body 82 and the tip 90. The addition of the inlet cooling port 110 and the cooling port 118 allows cooling of the fuel injector as described below.

FIG. 4 illustrates a fuel flow schematic for a fuel injection system 122. Shown is fuel supply tank 126, fuel line 128, fuel filter 130, fuel pump 132 which includes delivery pump 134 and high pressure pump 138, and fuel lines 142 connected to the fuel inlet ports 98 of the injector bodies 82 of the injectors 70. Fuel line 146 is connected to the cooling port 110 of injector 70d. Ports 114 and 110 of injectors 70d and 70c are in fluid communication, ports 114 and 110 of injectors 70c and 70b are in fluid communication and ports 114 and 110 of injectors 70b and 70a are in fluid communication. Port 114 of injector 70a is connected to return fuel line 148. The fuel flowing through ports 98, 110, and 114 mixes in space 94 and provides for a fuel flow through at least three locations in injector body 82 to maintain the injector body at a temperature which is approximately the average temperature of the fuel in space 94.

Figure 10:
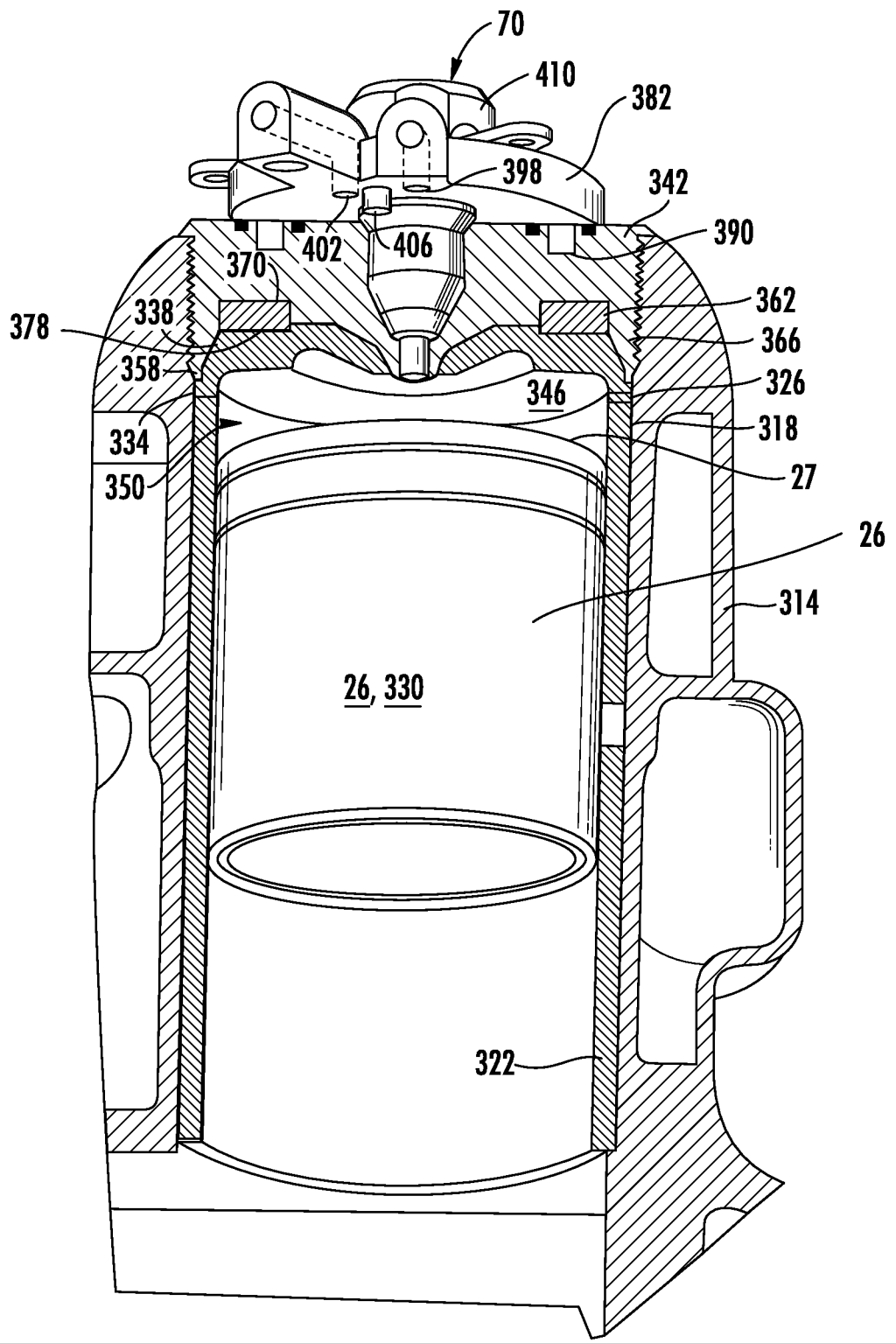
FIG. 10 is a partial sectional view of a portion of the engine shown in FIG. 9.

Referring to FIGS. 2, 5 and 10, it can be seen that the injectors are engaged and in thermal contact with the cylinder head 78, 342 and in thermal contact with fire plate 338 (if used). As a consequence, the additional cooling provided by cooling ports 110 and 118 allow engine 10 to operate with relatively high surface temperatures on the surfaces of chamber 74. Without these ports, the surface temperatures would need to be lower to prevent over heating of body 82 and the fuel which flows through body 82. By providing an injector with additional cooling, combustion chamber 74 temperatures for burning lower cetane fuels are more readily achieved. In addition, the warmed overflow fuel will warm all of the fuel in the system which serves to limit jelling of the fuel at cold temperatures of the type experienced in cold weather or at high altitudes.

Figure 8:
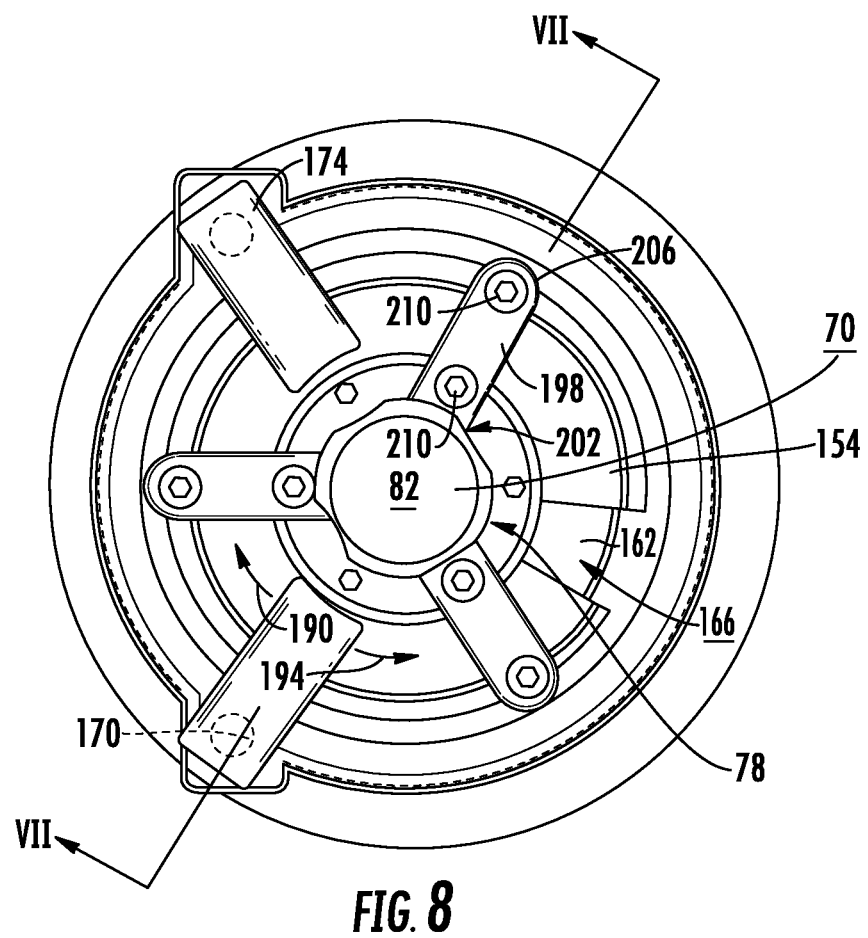
FIG. 8 is a top-view of FIG. 5.

FIGS. 5 and 8 illustrate a cooling cap 154 mounted on the cylinder head 78 to cool the cylinder head 78. The cooling cap 154 has an annular coolant groove 158 which mates with an annular coolant groove 162 of the cylinder head 78 to define an annular cooling passageway 166 when the cooling cap 154 is mounted on the cylinder head 78. In other embodiments, such as the embodiment which is illustrated in FIGS. 9-12, only one of the cooling cap 154 and the cylinder head 78 includes a groove such that the combination of the cooling cap 154 and the cylinder head 78 define the annular cooling passageway 166. The cooling cap 154 includes inlet port 170 and outlet port 174 which communicate with the annular cooling passageway 166, so that cooling fluid can flow into the inlet port 170, through the annular cooling passageway 166 and out the outlet port 174, thereby cooling the cylinder head 78. As used within the claims, "substantially annular" includes an enclosed loop similar to that illustrated in FIGS. 5 and 8, and a partial loop similar to that illustrated in FIGS. 9-12 (e.g., an annular groove that is separated by a divider pin, or projection 406).

The engine block 14 includes a cooling jacket 178 with an outlet 182 and an inlet (not shown). The cooling cap 154 is placed on the cylinder head 78 with the inlet port 170 in alignment with the outlet port 182 of the cooling jacket 178 and the outlet port 174 in alignment with the inlet port of the cooling jacket 178. A first transfer tube 186 communicates between the inlet port 170 of the cooling cap 154 and the outlet port 182 of the cooling jacket 178, and a second transfer tube (not shown) communicates between the outlet port 174 of the cooling cap 154 and the inlet port of the cooling jacket 178.

As shown in FIG. 8, the inlet port 170 and the outlet port 174 of the cooling cap 154 are not diametrically opposed around the annular cooling passageway 166. Thus, a first portion of the annular cooling passageway 166 extends in one direction from the inlet port 170 to the outlet port 174 (representatively shown as arrow 190 in FIG. 8) and a second portion of the annular cooling passageway 166 extends in an opposite direction from the inlet port 170 to the outlet port 174 (representatively shown as arrow 194 in FIG. 8). The first portion of the annular cooling passageway 166 is shorter in length than the second portion of the annular cooling passageway 166. The flow rate through the annular cooling passageway 166 in either direction is proportional to the distance traveled. The first portion of the annular cooling passageway 166 is restricted. In this way, cooling fluid travels in both directions through the annular cooling passageway 166 to cool the cylinder head 78.

The cooling cap 154 is adjustably positionable around the cylinder head 78, so that the inlet port 170 and the outlet port 174 are properly alignable with the associated inlet and outlet ports of the cooling jacket 178. This accommodates the cylinder head 78 which threads into the cylinder block or engine block 14. Engine block 14 includes female threads concentric with the cylinder 22, and the cylinder head 78 includes male threads which engage the female threads of the engine block 14. Because the cylinder head 78 threads into the engine block 14, it is not exactly known where the cylinder head 78 will be located with respect to the engine body. Once the adjustable cooling cap 154 is properly located on the cylinder head 78, a plurality of clamping members 198, preferably equally spaced apart, span across the top of the cooling cap 154 to secure the cooling cap 154 to the cylinder head 78. Each of the clamping members 198 has opposite ends 202 and 206, and is secured to the cylinder head 78 by a pair of fasteners 210. One fastener 210 is located adjacent end 202 and the other fastener 210 is located adjacent end 206. Preferably, the fasteners 210 thread into the top of the cylinder head 78. Preferably, the cylinder head 78 includes a plurality of sets of pre-drilled, threaded holes such that each fastener 210 can be located in a plurality of positions relative to the cylinder head 78. Preferably, end 202 of each clamping member 198 is received by an annular groove 214 in the fuel injector nut 86, thereby also securing the fuel injector 70 to the cylinder head 78.

In the embodiment illustrated in FIGS. 5 and 8, the coolant initially flows from a pump (not shown) into the cooling jacket 178. From the cooling jacket 178, the coolant flows through the outlet port 182 of the cooling jacket 178 into the first transfer tube 186, and then into the inlet port 170 of the cooling cap 154. From the inlet port 170, the coolant travels through the cooling passageway 166 to the outlet port 174 of the cooling cap 154 removing heat from the cylinder head 78. The coolant then flows from the outlet 174 of the cooling cap 154 through the second transfer tube and inlet port of the cooling jacket 178 to return to the cooling jacket 178. From the cooling jacket 178, the heated coolant is returned to the pump of the coolant system to be cooled and returned to the cooling jacket 178.

Figure 13:
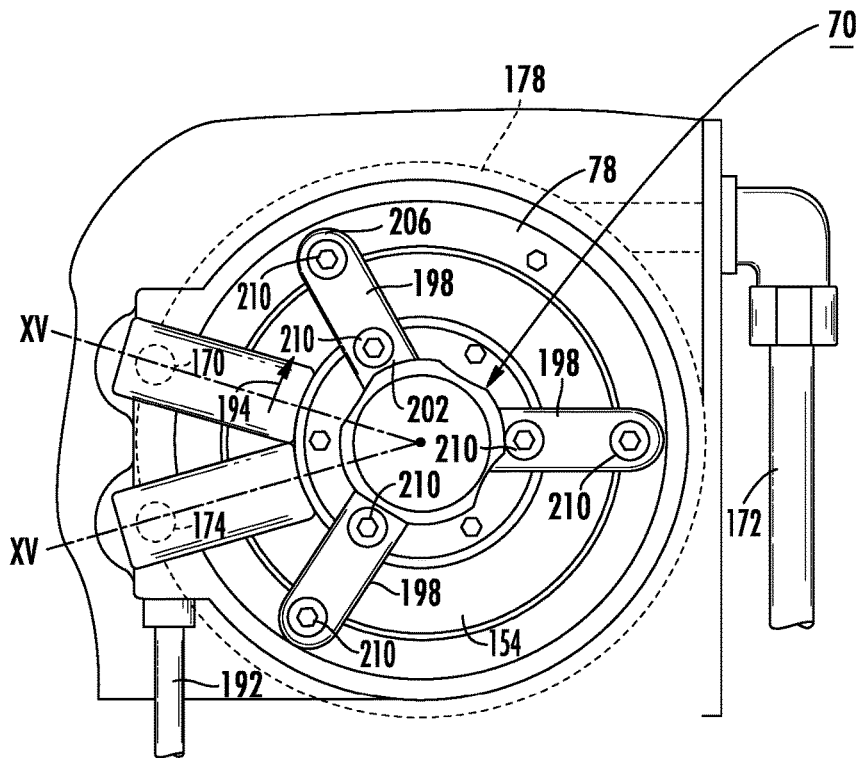
FIG. 13 is a top view of a cylinder head and cooling cap according to another embodiment of the invention.
Figure 14:
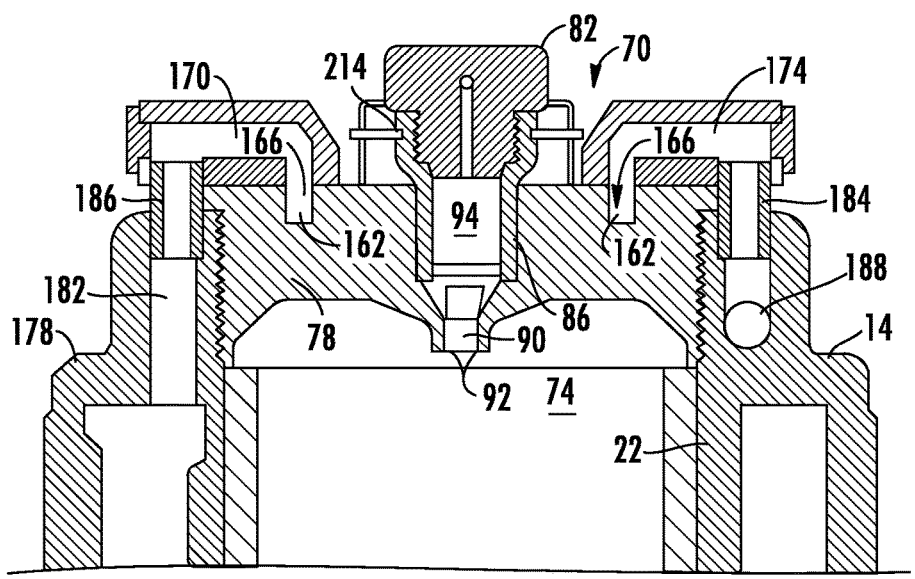
FIG. 14 is a cross-sectional view taken along line XV-XV of FIG. 13.

Another embodiment of the cooling cap 154 is illustrated in FIGS. 13 and 14. This embodiment is substantially similar to the embodiment shown in FIGS. 5 and 8 except that the embodiment illustrated in FIGS. 13 and 14 includes a different coolant flow path. Reference numbers used with respect to the embodiment illustrated in FIGS. 5 and 8 are also used in FIGS. 13 and 14 to indicate like components.

With reference to FIGS. 13 and 14, the coolant initially flows from a pump (not shown), through a supply conduit 172, and into the cooling jacket 178. From the cooling jacket 178, the coolant flows into and through the outlet port 182 of the cooling jacket 178, through the first transfer tube 186, through the inlet port 170 of the cooling cap 154, and into the annular cooling passageway 166. From the inlet port 170, the coolant travels through the cooling passageway 166 in the direction of arrow 194 to the outlet port 174 of the cooling cap 154 removing heat from the cylinder head 78. In this embodiment, the coolant is blocked from flowing toward the outlet 174 in a direction opposite to the arrow 194. The coolant then flows from the outlet 174 of the cooling cap 154 through a second transfer tube 184 and into a return port 188. From the return port 188, the coolant is directed back to the pump through the return line 192 to be cooled and returned to the cooling jacket 178 through the supply conduit 172. As just described, the coolant flows into the cooling jacket 178, then flows into the cooling cap 154, and then returns to the pump. In contrast, the coolant used with the embodiment illustrated in FIGS. 5 and 8 flows into the cooling jacket 178, then flows into the cooling cap 154, then flows back into the cooling jacket 178, and then finally returns to the pump.

In one embodiment of engine 10, a cross-feed cooling passageway extends between the respective cooling jackets for the engine cylinders providing cooling fluid flow between the cooling jackets. The cross-feed cooling passageway may be drilled through the portion of the engine block 14 supporting the main bearing support for the crankshaft. If a thermostat communicating with the one of the cooling jackets 178 fails, the cross-feed cooling passageway enables cooling fluid to continue to flow to minimize or prevent damage to the respective cylinder head. The cross-feed cooling passageway also reduces the thermal gradient between the cylinder heads and the lower crankcase of the engine to reduce distortion of the aluminum block due to unacceptable temperature gradients and, thereby increase engine life.

Figure 9:
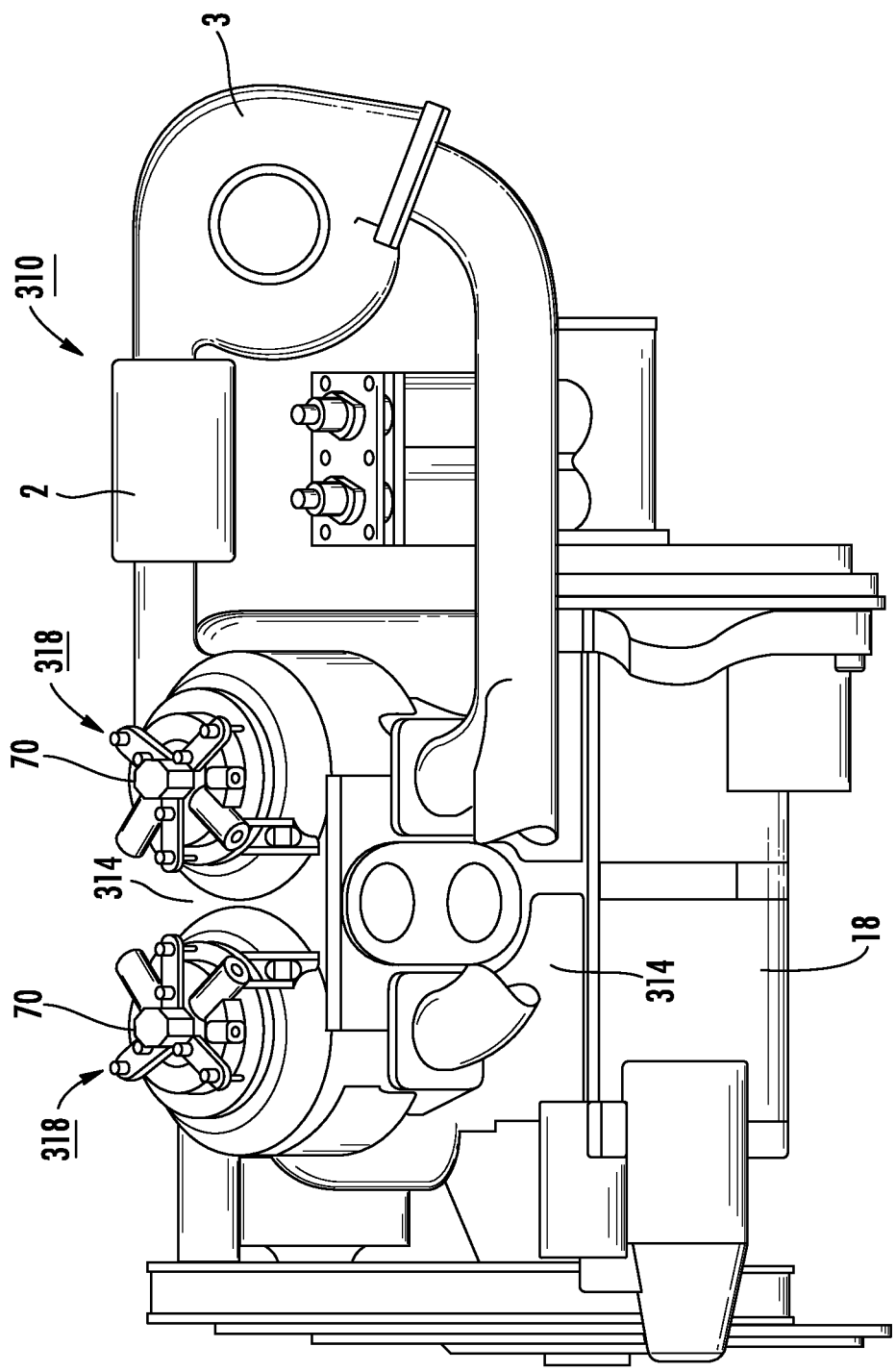
FIG. 9 is an elevational view of another internal combustion engine in which the present invention is employed.

Illustrated in FIG. 9 is another embodiment of the engine, referenced as engine 310. In this embodiment, a cylindrical sleeve 322 is positioned within the cylinder 318. The sleeve 322 may be an aluminum sleeve that is shrink fitted into the cylinder 318 and bonded to the engine block 314 with an epoxy resin having an aluminum filler. The sleeve 322 includes a shoulder 326. A piston 330 reciprocates within the sleeve 322. Preferably, the sleeve would be fabricated from a metal matrix to provide a wear resistant internal surface at surface temperatures which permit efficient combustion of relatively low cetane diesel fuels. One example of such a matrix is a 10S4G Aluminum Composite. Application-10S4G uses a silicon carbide (SiC) particulate and a nickle (Ni) coated graphite for improved wear resistance, continuous lubricity and good high temperature strength. The base alloy of the matrix by weight percent is composed of Silicon (8.5-9.5%), Iron (0.20% maximum), Copper (0.20% maximum), Manganese (0.10% maximum), Magnesium (0.45-0.65%), Zinc (0.10% maximum), Titanium (0.20% maximum), Other matter (0.05% maximum each and 0.15 maximum total), Aluminum (remainder %). To form the final composite SiC and Ni coated graphite are added to the base alloy. In one embodiment, the SiC is 10% by volume and is nominally 30 microns in diameter, and the Ni coated graphite (e.g. Novamet 60% NCG) is 4% by volume. Then, the combined composite is solution and precipitation heat treated. The final composite following treatment has specific tensile and yield properties. When measured at room temperature, the final composite has a minimum tensile strength of 33 KiloPounds per square inch (KSI) and a minimum yield of 27 KSI. When measured at approximately 300 degrees Fahrenheit, the final composite has a minimum tensile strength of 23 KSI and a minimum yield of 20 KSI.

As another suitable alternative, sleeve 322 would be fabricated from aluminum with a steel coated internal surface. These embodiments provide for another portion of the internal surface of combustion chamber 74 which can be maintained at relatively high temperatures during engine operation to provide improved engine performance with relatively low cetane diesel fuels. By way of example, the steel coating of sleeve 322 is preferably accomplished with steel wire used in a plasma-transferred wire arc process. After the appropriate amount of steel is applied to the internal surface of the sleeve 322, the surface is honed for use with an appropriate piston and ring set.

Figure 11:
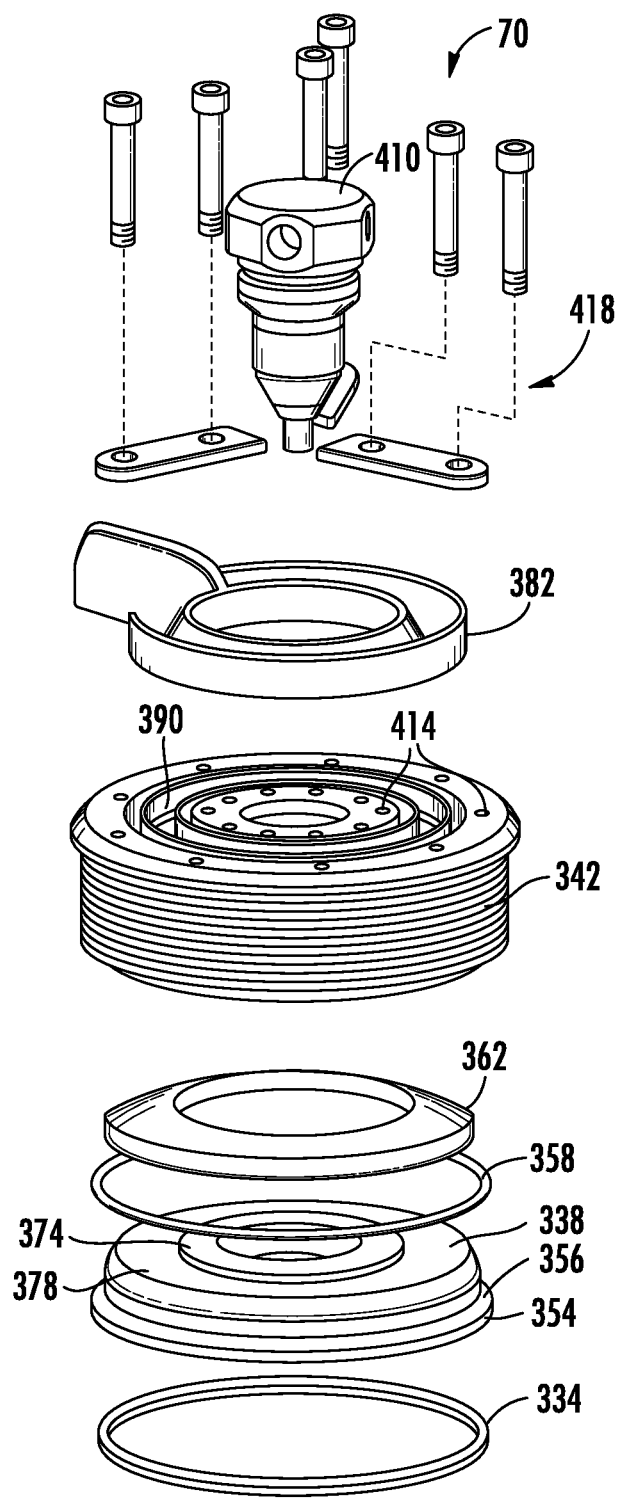
FIG. 11 is an exploded perspective view of certain components of the engine of FIG. 9 and as further shown in FIG. 10.
Figure 12:
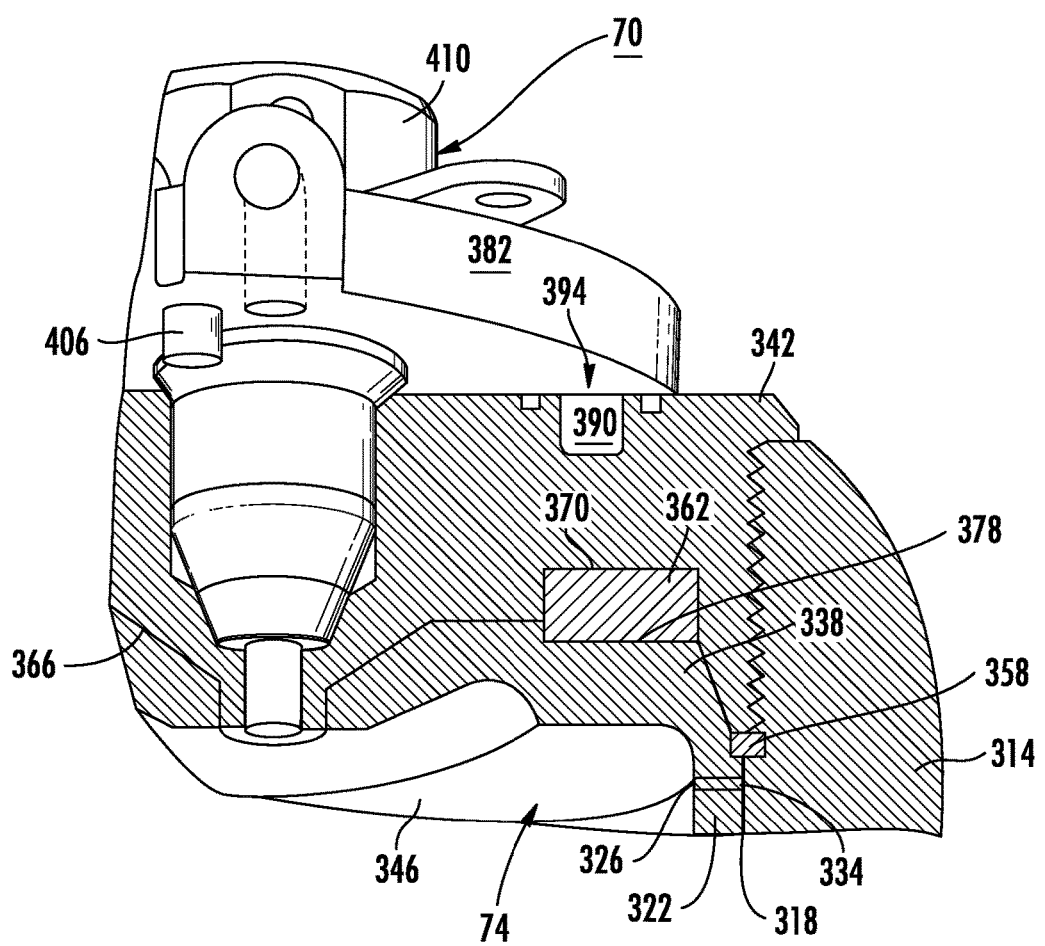
FIG. 12 is an enlarged view of a portion of FIG. 10.

Referring to FIGS. 10-12, a gasket 334 is positioned on the shoulder 326 of the sleeve 322. In one embodiment, the gasket 334 is a copper gasket. As will be further explained below, the, gasket 334 acts as both a sealing mechanism and a shimming device.

The fireplate 338 is positioned between a cylinder head 342 and the gasket 334. A bottom side 346 of the fireplate 338 cooperates with the crown 27 of piston 330 and the sleeve 322 to define a combustion chamber 350. An annular ledge 354 on the fireplate 338 receives an O-ring 358 to provide a seal between the side wall 356 of the fireplate 338 and the cylinder 318. In one design, the cylinder head 342 is made of aluminum and the fireplate 338 is made of stainless steel which provides a surface for chamber 350 which is suitable for use at a relatively high temperature during engine operation.

A head spring 362 is positioned between the cylinder head 342 and the fireplate 338. A bottom side 366 of the cylinder head 342 has an annular groove 370 which receives the head spring 362, and a top side 374 of the fireplate 338 has a recess 378 which also receives the head spring 362. The head spring 362 is preferably a belleville spring. The head spring 362 is also preferably made of stainless steel. Belleville springs take the form of a shallow, conical disk with a hole through the center thereof. A very high spring rate or spring force can be developed in a very small axial space with these types of springs. Predetermined load-deflection characteristics can be obtained by varying the height of the cone to the thickness of the disk.

As can be observed with reference to FIGS. 10-12, the cylinder head 342 threads into a portion of the engine block 314. When the cylinder head 342 is threaded into the engine block 314, the cylinder head 342 compresses the head spring 362 against the fireplate 338 to provide a downward force against the top side 374 of the fireplate 338 to offset an upward force created by combustion within the combustion chamber 350. The downward force provided by the deflection or deformation of spring 362 generates a spring force which resiliently forces fireplate 338 into contact with the gasket 334, which is forced against shoulder 326 of the sleeve 322 to provide an appropriate combustion seal during operation of the engine 310.

The head spring 362 also acts to allow for the expansion and contraction of the relevant mating engine components during changing loading and thermal conditions of the engine 310 without adversely affecting the combustion seal, much like traditional head bolts act. As noted above, head bolts can be used to provide a clamping force that seals a cylinder head to an engine block. Because the head bolts are allowed to expand and contract with the associated engine components as the loading and temperature of the engine varies, the head bolts are capable of maintaining the clamping force during operation of the engine. However, the threaded cylinder head 342 does not generally have the stretching capabilities of typical head bolts because of its relatively large diameter and short thread length.

As suggested above, the load provided by the head spring 362 can be calculated based on the deflection of the spring 362. A specific amount of deflection translates into a consistent amount of downward force, which ensures a proper combustion seal. In one embodiment, the desired deflection for the head spring 362, the cylinder head 342 and associated components are obtained by assembling the components as shown in FIG. 11. The threads which hold cylinder head 342 in place can be preloaded. By preloading these threads or head bolts (if a bolted head configuration is used) the range of varying force applied to the threads or bolts is reduced, thus increasing the fatigue life of these components.

The use of gasket 334 allows for the effective control of the location of piston 330 relative to fireplate 338 to accurately set the top dead center of piston 330 relative to fireplate 338. In particular, gasket 334 accommodates the accumulation of a deviation from ideal dimensions resulting from the combination of the tolerances associated with the engine block 314, the cylinder head 342, the sleeve 322, and the piston 330. After the fireplate 338 is positioned on the gasket 334, the cylinder head 342 is threaded into the engine block 314 until such time as the bottom side 366 of the cylinder head 342 contacts the top side 374 of the fireplate 338. Once contact is made between the cylinder head 342 and the fireplate 338, the final assembly position of the cylinder head 342 with respect to the engine block 314 is known. The final assembly position of the cylinder head 342 is then marked or otherwise recorded for future reference so that a gasket 334 of appropriate thickness can be selected for final assembly.

Providing a cooling system for the cylinder head 342 allows the combustion chamber surfaces to operate at sufficiently high temperatures to accommodate low cetane fuels. A cooling cap 382 is mounted on the cylinder head 342. The cooling cap 382 cooperates with an annular groove 390 of the cylinder head 342 to define a cooling passageway 394. The cooling cap 382 includes an inlet port 398 and an outlet port 402. The inlet port 398 is adapted to receive a cooling fluid flowing through the engine 310, and the outlet port 402 is adapted to send the cooling fluid on through the engine 310 after the cooling fluid has been used to cool the cylinder head 342. As best shown in FIG. 10, the inlet port 398 and the outlet port 402 are adjacent to one another. A divider pin, or projection 406 extends from the cooling cap 382 into the cooling passageway 394 (see FIG. 12) to substantially close the short passageway between the inlet port 398 and the outlet port 402. In this way, the cooling fluid is only allowed to flow around the cooling passageway 394 in a single direction to cool the cylinder head 342. Although allowing the cooling fluid to flow in both directions around the cooling passageway 394 between the inlet port 398 and an outlet port 402 would cool the cylinder head 342, it has been determined that causing the cooling fluid to flow in one direction around substantially the entire cooling passageway 394 also provides effective cooling. In other embodiments, the divider pin 406 is eliminated and only a partial annular groove is formed in the cylinder head 342 and/or the cooling cap 382 such that the combination of the cylinder head 342 and the cooling cap 382 define a unidirectional cooling passage without the need for a divider pin 406. In a further embodiment, divider pin 406 is configured to allow some portion of cooling fluid to flow into the short passageway between the inlet port 398 and the outlet port 402. Allowing cooling fluid to flow into the short passageway maintains a substantially uniform cooling around the cylinder head 342.

The manner of attaching the cooling cap 382 to the cylinder head 342 is substantially described above in relation to engine 10. Reference is also made to the description above in relation to engine 10 for the description and manner of operating the fuel injector 410. In one embodiment engine 310 includes nine sets of holes 414 for the associated clamping members 418, as compared to the six sets of holes as shown for engine 10. It was determined that nine sets of holes enables easier positioning of the cooling cap 382 with respect to the cylinder head 342. In an alternative embodiment, cooling cap 382 is fastened to cylinder head 342 with 3 clamping members 418. In this embodiment, the external most holes from the set of holes 414 are omitted and only the interior nine holes are needed to position cooling cap 382 with respect to the cylinder head 342.

Figure 15:
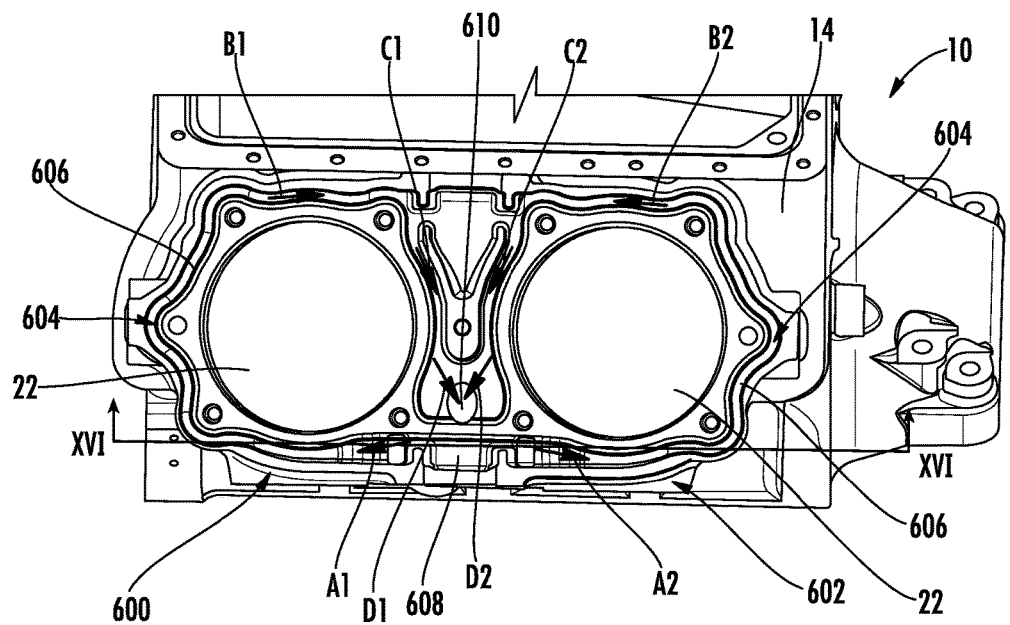
FIG. 15 is a top down view of the engine block having the cylinder heads removed and cut to see the flow path of the exhaust pipe cooling system.

Referring now to FIG. 15, a top down view of one side of the engine block 14 having the cylinder heads removed and cut perpendicularly across is shown. Each cylinder head 22 includes a corresponding exhaust pipe a first exhaust pipe 600 in communication with one of the cylinders 22 and a second exhaust pipe 602 in communication with a different one of the cylinders 22 are shown in FIG. 15. Engine block 14 includes a water jacket 604 surrounding two of the cylinders 22. A similar setup is used for the two cylinders on the opposite side of the engine 10 (not shown). Water jacket 604 includes a channel 606 in which cooling fluid flows around the first and second exhaust pipes 600 and 602 and the cylinders 22 in the manner described below to remove heat from the system. Cooling fluid enters water jacket 604 from a pump (not shown) at cooling intake port 608. The cooling fluid flows at a constant rate in the directions indicated by arrows A1 and A2 through channel 606 around both cylinders 22 as indicated by arrows B1 and B2 and C1 and C2. The cooling fluid flows into cooling outtake port 610 as show by arrows D1 and D2. From cooling outtake port 610, the cooling fluid is returned to the pump where it is cooled and pumped back into cooling intake port 608. In one embodiment, water jacket 604 and cooling jacket 178 described above are integrated and the coolant flows around both the cylinders 22, the first and second exhaust pipes 600 and 602, and the cylinder heads as described above before returning to the pump.

Figure 16:
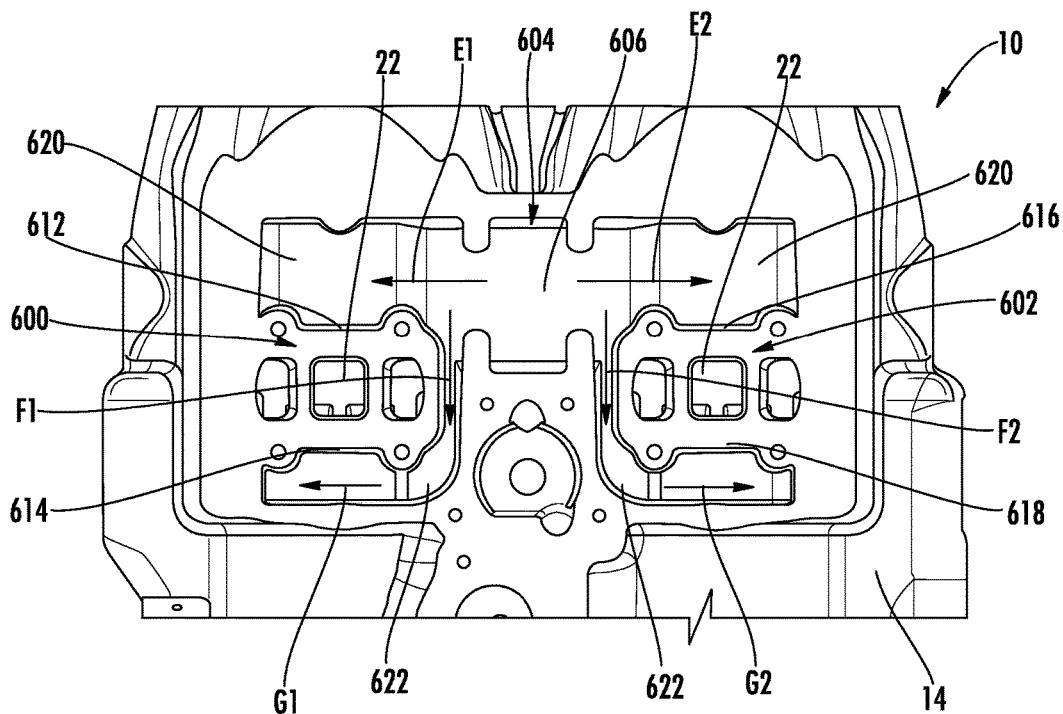
FIG. 16 is a cross-sectional view taken along line XVI-XVI of FIG. 15.

Referring now to FIG. 16, a cross-sectional view of engine 10 and water jacket 604 taken along line XVI-XVI of FIG. 15 is shown. First exhaust pipe 600 includes a top portion 612 and a bottom portion 614. Similarly, second exhaust pipe 602 includes a top portion 616 and a bottom portion 618. In one embodiment, channel 606 includes a first branch 620 passing over the top portions 612 and 616 and a second branch 622 passing under the bottom portions 614 and 618. The first and second branches merge together on the opposite sides of exhaust pipes 600 and 602 to reform uniform channel 606. In this embodiment, the cooling fluid flows into water jacket 604 and begins to flow around cylinders 22 as indicated by arrows A1 and A2 in FIG. 15. As the cooling fluid approaches the first and second exhaust pipes 600 and 602, one portion of the cooling fluid flows over the top portions 612 and 616 as indicated by arrows E1 and E2 while another portion of the cooling fluid is diverted to flow under the bottom portions 614 and 618 as indicated by arrows F1 and F2 and G1 and G2. After the cooling fluid passes separately over the top and bottom portions of exhaust pipes 600 and 602, the two fluid flows merge to continue flowing around cylinders 22 as described above. Having cooling fluid flow over the top and bottom portions of the exhaust pipes 600 and 602 allows for bidirectional cooling and prevents the bottom portions 614 and 618 from overheating that can occur when the exhaust pipes are only cooled from the top.

Figure 19:
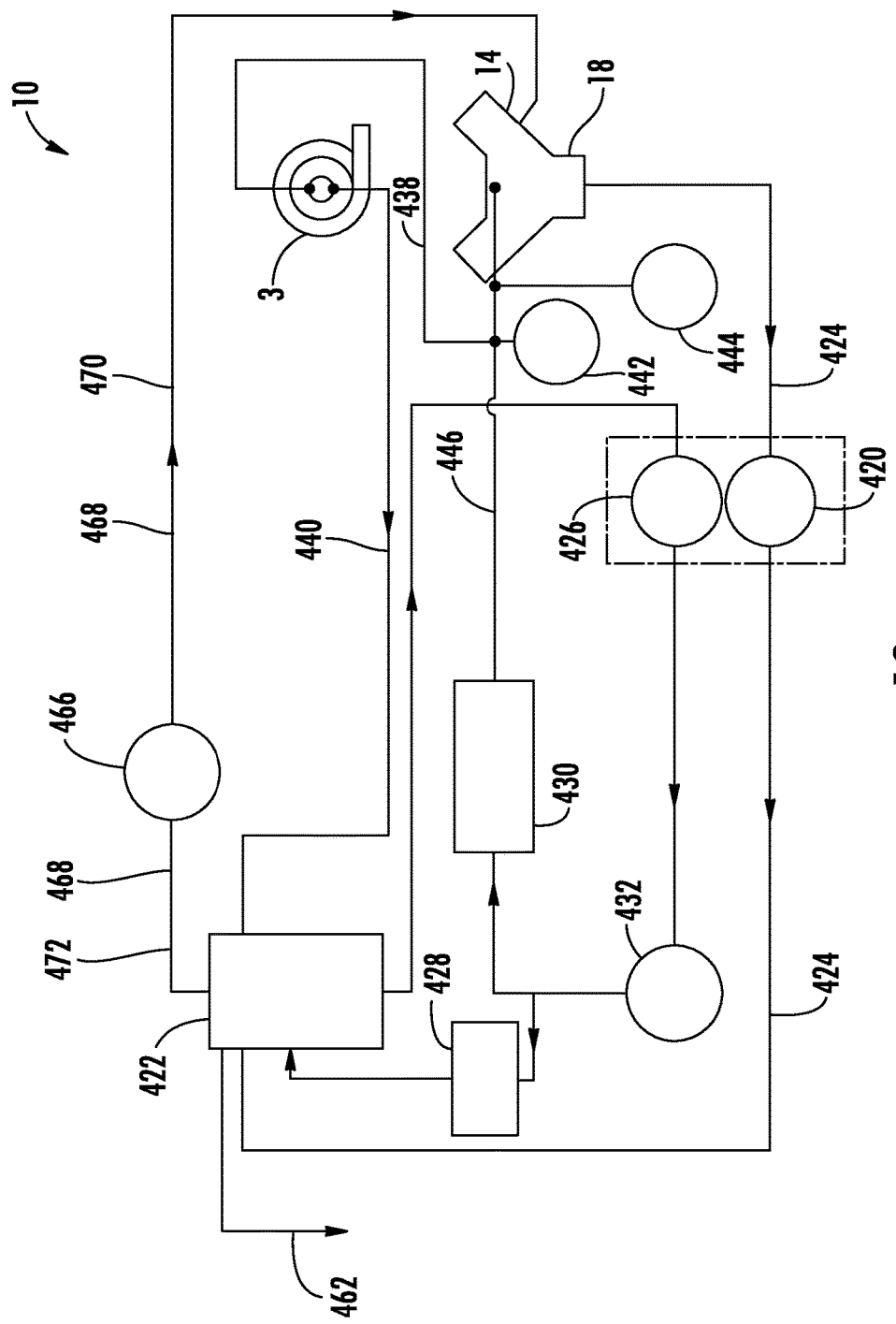
FIG. 19 is an oil flow diagram of the engine of FIG. 1.

Referring to FIG. 19, a schematic illustration of an embodiment of engine 10 as a dry sump engine that includes an oil sump pump or scavenge pump 420 to remove oil and air from within the crankcase 18. Referring to FIG. 19, the engine 10 also includes an oil tank 422 and a scavenge discharge line 424 that provides fluid communication between the crankcase 18, the scavenge pump 420, and the oil tank 422. Engine 10 further includes a supply oil pump 426, an oil pressure regulator 428, and an oil cooler or heat exchanger 430. The oil supply pump 426 supplies oil to the engine block 14 and crankcase 18 from the oil tank 422 during operation of the engine 10. The oil pressure regulator 428 bleeds or allows a portion of oil to travel back to the oil tank 422 if the discharge pressure of the supply pump 426 exceeds a predetermined value. For example, in one construction, the oil pressure regulator 428 is set such that the oil pressure within the heat exchanger 430 does not exceed about 150 psi. An oil filter 432 is disposed between the oil tank 422 and the engine block 14 to filter oil supplied to the engine block 14 from the tank 422.

Figure 20:
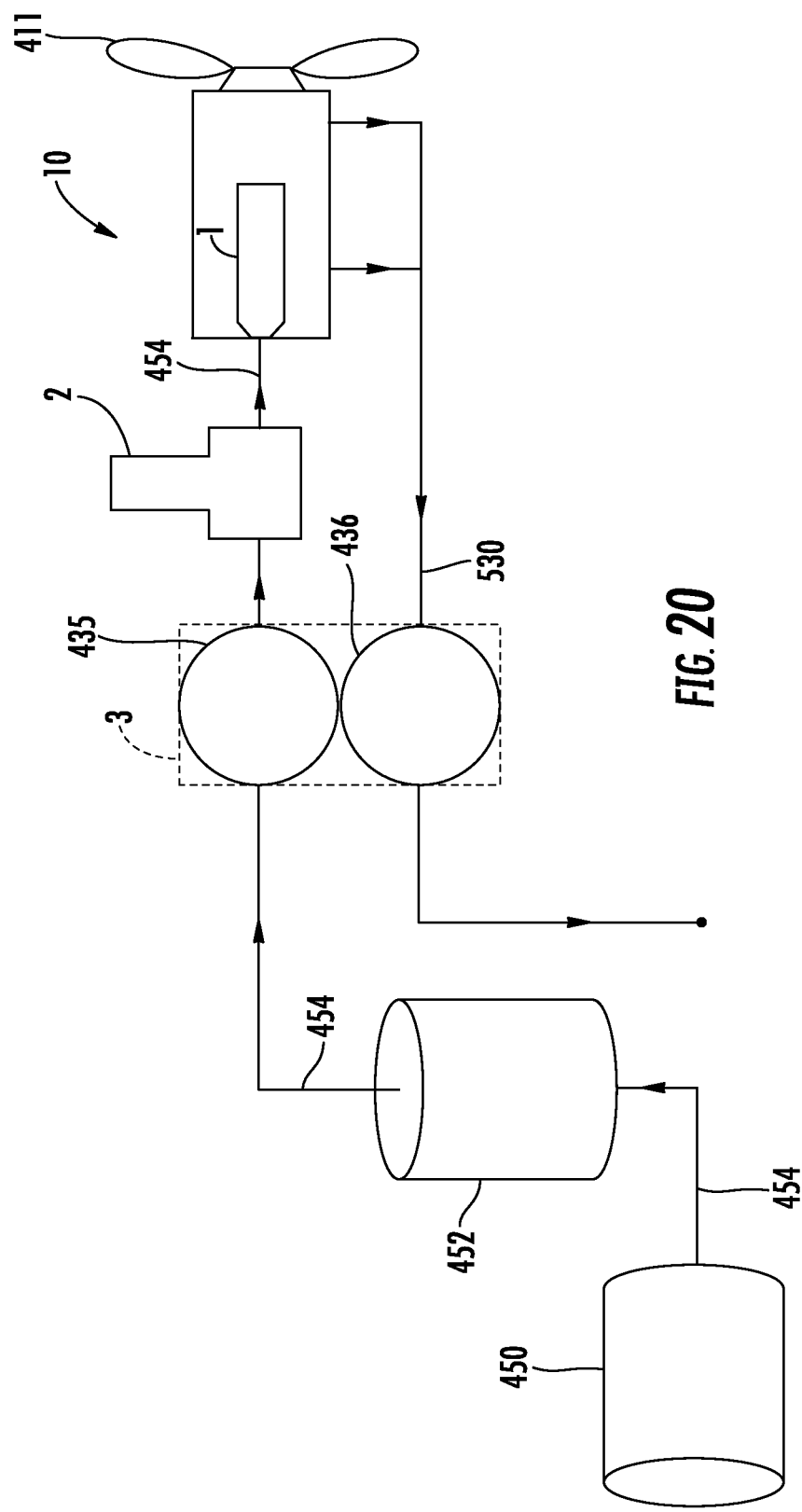
FIG. 20 is an air flow diagram of the engine of FIG. 1.

Referring to FIGS. 19 and 20, a schematic view of an embodiment of engine 10 wherein turbocharger 3 includes a compressor 435 and a turbine 436 that drives the compressor 435 using exhaust gas from the engine 10. An oil supply line 438 (FIG. 19) fluidly couples the turbocharger 3 and the oil tank 422 to supply oil to the turbocharger 3. An oil return line 440 fluidly couples the turbocharger 3 and the oil tank 422 to return oil from the turbo charger 3 back to the oil tank 422. A pressure sensor 442 and a temperature sensor 444 are in fluid communication with a main oil supply line 446 to sense the pressure and temperature, respectively, of oil being supplied to the engine block 14, the crankcase 18, and the turbocharger 3.

Referring to FIG. 20, an air inlet 450 and an air filter 452 are arranged in series in an air inlet line 454 of the engine 10. Referring to FIG. 19, an air vent line 462 fluidly couples the oil tank 422 with the air inlet 450 to vent the oil tank 422 to the air inlet line 454.

The engine 10 further includes a crankcase pressure regulator 466 that is in fluid communication with the oil tank 422 and the crankcase 18 via a crankcase breather line 468. The crankcase breather line 468 includes a first portion 470 that extends between the crankcase pressure regulator 466 and the crankcase 18 to provide fluid communication between the crankcase 18 and the crankcase pressure regulator 466. A second portion 472 of the breather line 468 extends between the pressure regulator 466 and the oil tank 422 to provide fluid communication between the pressure regulator 466 and the oil tank 422.

Figure 17:
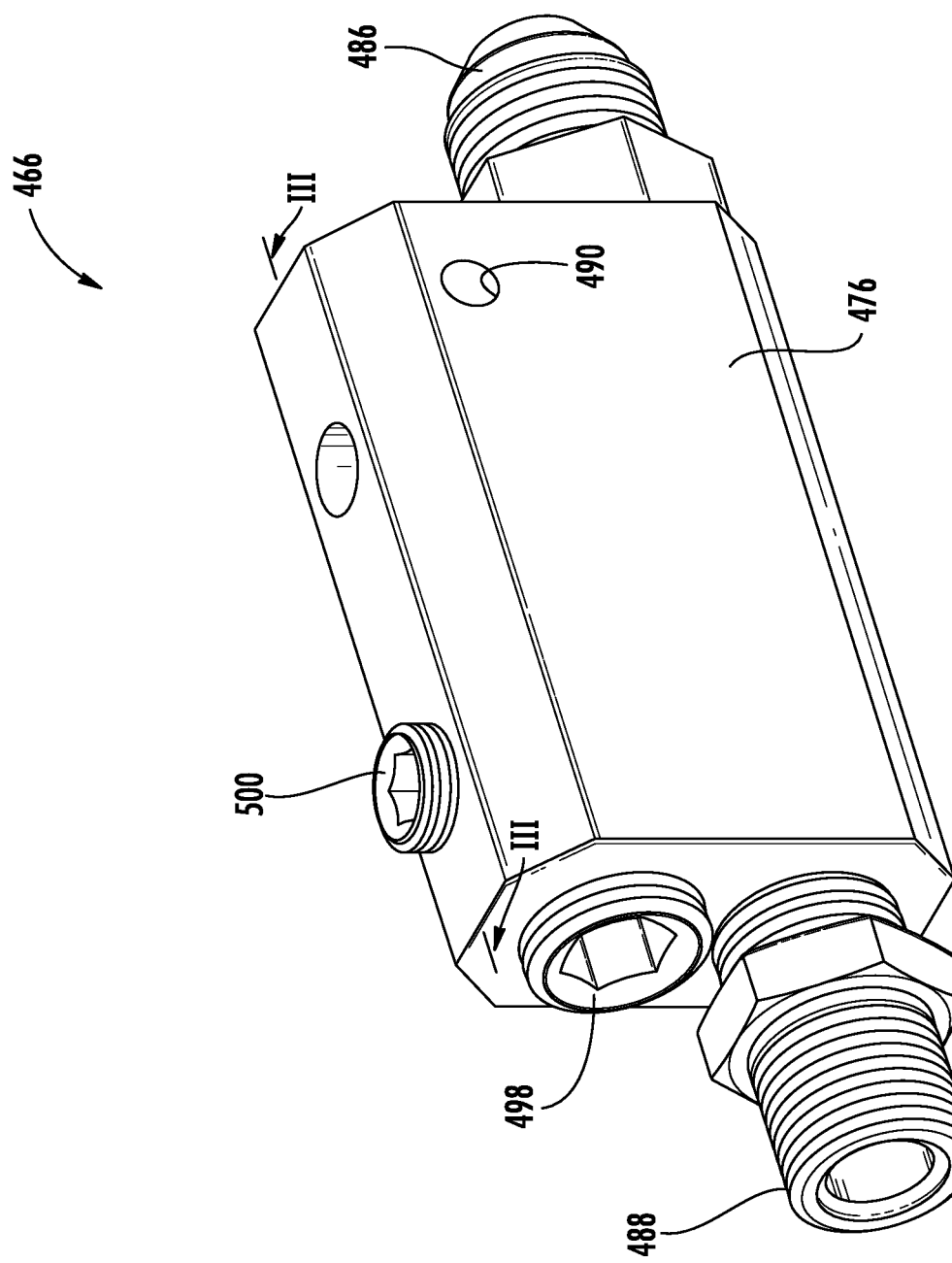
FIG. 17 is a perspective view of a crankcase pressure regulator of the engine of FIG. 1.
Figure 18:
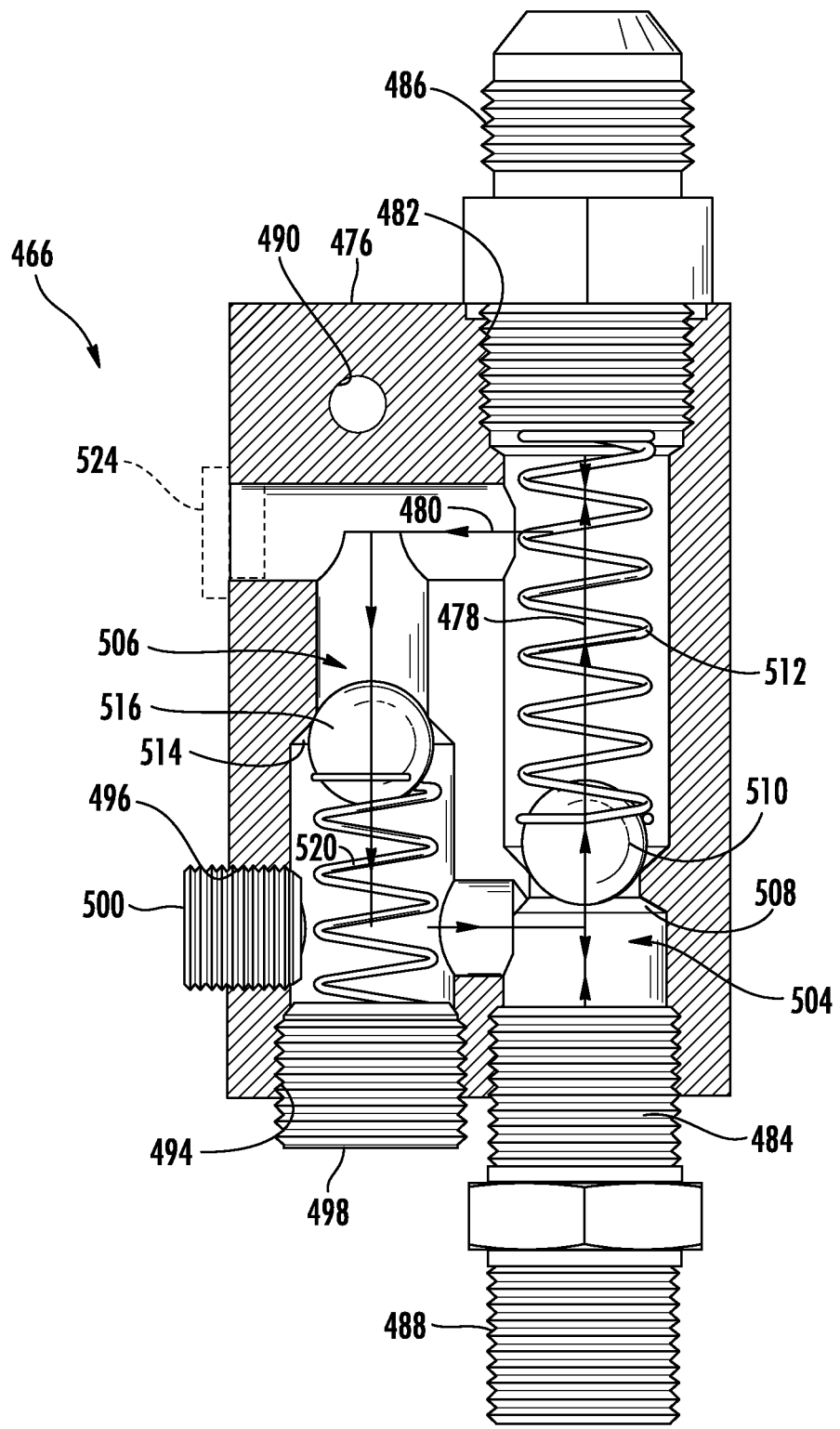
FIG. 18 is a partial cross-sectional side view of the crankcase pressure regulator of FIG. 17 taken along line III-III of FIG. 17.

Referring to FIGS. 17 and 18, the crankcase pressure regulator 466 includes a body 476. In one embodiment, the body 476 is formed to define a first internal passageway 478 and a second internal passageway 480 that both extend through the body 476 of the pressure regulator 466. The body 476 further includes a first aperture 482 and a second aperture 484. The first passageway 478 is defined as a flow path through the first aperture 482 and the second aperture 484. The second passageway 480 is defined as a flow path through the first aperture 482 and the second aperture 484 such that the second passageway 480 is in a parallel arrangement to the first passageway 478. A first connector 486 is partially located within the first aperture 482 in order to fluidly couple the first aperture 482 with the crankcase 18 of the engine 10 via the first portion 470 of the breather line 468. A second connector 488 is partially located within the second aperture 484 to fluidly couple the second aperture 484 with the oil tank 422 via the second portion 472 of the breather line 468. While the first and second connectors 486 and 488, respectively, are threaded nipples or bushings, in other constructions, any suitable connector can be utilized.

Furthermore, while FIG. 20 schematically illustrates the crankcase pressure regulator 466 connected to the crankcase breather line 468 at both the connectors 486 and 488, the connectors 486 and 488 can be utilized to directly couple the pressure regulator 466 to either the crankcase 18 or the oil tank 422. For example, in one construction the pressure regulator 466 can be mounted on the oil tank 422 using an aperture 490 of the body 476 and the second connector 488 can be connected to the oil tank 422. Of course, in other constructions, other suitable arrangements of the pressure regulator 466 within the flow path of the crankcase 18, crankcase breather line 468, and the oil tank 422 can be utilized.

The body 476 of the pressure regulator 466 further includes a first auxiliary aperture 494 and a second auxiliary aperture 496. The first and second auxiliary apertures 494 and 496 are utilized while manufacturing the pressure regulator 466 to access the passageways 478 and 480 and other components within the pressure regulator 466. In one embodiment, threaded plugs 498 and 500 are utilized to block or close the apertures 494 and 496, respectively, after the requisite manufacturing and assembling processes are completed within the body 476.

The pressure regulator 466 further includes a first check valve 504 and a second check valve 506. The first check valve 504 includes a seat 508, which is integrally formed in the body 476. The first check valve 504 further includes a valve member 510, and a biasing member 512. In one embodiment, valve member 510 is a ball and biasing member 512 is a coil spring. The biasing member 512 contacts the first connector 486 to bias the valve member 510 against the seat 508 or into a closed position of the valve 504. As will be discussed in more detail below, the first check valve 504 regulates flow through the first passageway 478, and the first check valve 504 is arranged to allow fluid flow through the first passageway 478 in the direction of the arrows of FIG. 18 along the first passageway 478 while preventing fluid flow in the opposite direction.

The second check valve 506 includes a seat 514, which is integrally formed in the body 476. The second check valve 506 further includes a valve member 516, and a biasing member 520. In one embodiment, valve member 516 is a ball and biasing member 520 is a coil spring. The biasing member 520 of the second check valve 506 contacts the threaded plug 498 of the first auxiliary aperture 494 such that the valve member 516 is biased against the seat 514 or into a closed position of the valve 506. As will be discussed in more detail below, the second check valve 506 regulates flow through the second passageway 480, and the second check valve 506 is arranged to allow fluid flow through the second passageway 480 in the direction of the arrows of FIG. 18 along the second passageway 480 while preventing fluid flow in the opposite direction. While the check valves 504 and 506 in the illustrated construction are ball-type check valves, it should be understood that other types of valves and check valves can be utilized.

In one embodiment, the crankcase pressure regulator 466 includes a pressure sensor 524. The pressure sensor 524 is in fluid communication with the first and second passageways 478 and 480, respectively, such that pressure sensor 524 is operable to measure the pressure within the crankcase 18 regardless of the position (i.e., open or closed) of the first and second check valves 504 and 506, respectively.

Referring to FIG. 20, during operation of the engine 10, ambient air for combustion is drawn through the air inlet 450, then through the air filter 452 by the compressor 435 of the turbocharger 3. The compressor 435 is driven by the turbine 436 to compress the combustion air. The turbine 436 is driven by exhaust gases from the engine 10 that are delivered to the turbine 436 by an exhaust line 530. The compressed combustion air then travels through the intercooler 2 and supercharger 1 before entering the combustion chamber of the engine 10.

Concurrently, referring now to FIG. 19, the scavenge pump 420 removes air and oil from within the crankcase 18 through the scavenge discharge line 424, which generally reduces the pressure within the crankcase 18 below the ambient pressure. The air and oil removed by the scavenge pump 420 can include air and oil from the combustion chamber that bypasses the piston rings.

The first check valve 504, which is biased into the closed position, inhibits make-up air from entering the crankcase 18 through the crankcase breather line 468 until the pressure within the crankcase 18 reaches a predetermined average lower level. Thus, the average pressure within the crankcase 18 is reduced and maintained below ambient pressure, particularly during low power operation of the engine 10. The first check valve 504 remains closed until the average crankcase pressure is less than the predetermined average lower level. When the crankcase pressure is less than the predetermined lower level, the pressure within the oil tank 422 (about ambient pressure) acting against the valve member 510 overcomes the force of the biasing member 512 to lift the valve member 510 from the seat 508 to open the first valve 504 to allow make-up air to flow into the crankcase 18 in order to maintain the air pressure within the crankcase 18 above the predetermined average lower level.

The pistons 26, 330 being alternatively drawn into the crankcase 18 and the pistons 26, 330 being pushed into the cylinders during the normal compression and combustion strokes of the engine 10 generate a pressure wave in the crankcase 18. In one construction of the engine 10, this pressure wave is about +/−4 psi. In such a construction, the biasing member 512 of the first check valve 504 can be chosen such that the first check valve 504 opens when the average pressure within the crankcase 18 is about −6 psi. Alternatively stated, the first check valve 504 opens to allow make-up air to pass through the first passageway 478 when the pressure within the crankcase 18 is 6 psi less than the pressure within the oil tank 422, which is about ambient pressure. Therefore, if the pressure wave is about +/−4 psi, the instantaneous pressure within the crankcase 18 will oscillate between about −10 psi and −2 psi and the peak of the pressure wave will not exceed ambient pressure (e.g., 0 psi). In the illustrated construction, the make-up air is drawn from the oil tank 422 through the breather line 468. While in the construction of the pressure regulator 466 discussed above, the first check valve 504 opens at −6 psi, in other constructions the first check valve 504 can open at an average pressure greater than or less than −6 psi. For example, the engine seals and/or the amplitude of the pressure wave generated by piston oscillation may make a different opening average pressure for the check valve 504 more desirable.

During operation of the engine 10, particularly during low power operation of the engine 10, the pressure within the intake manifold is relatively low or near atmospheric pressure. Thus, in the construction described above, the instantaneous pressure within the crankcase 18 does not exceed about −2 psi or remains lower than the intake manifold pressure. As a result, the amount of oil that is forced by pressure from the crankcase 18 toward the intake manifold is greatly reduced.

During high power operation of the engine 10, the pressure within the intake manifold can be relatively high. Furthermore, as discussed above, the pressure regulator 466 lowers the average pressure within the crankcase 18. As a result, there can be an excessive amount of air that leaks past the piston rings and into the crankcase 18. While the scavenge pump 420 removes air from the crankcase 18, the leakage may be at such a rate that the pump 420 is unable to remove a sufficient amount of air to maintain a negative (i.e., less than ambient) pressure within the crankcase 18. If the pressure within the crankcase 18 exceeds a predetermined average level, the second check valve 506 opens to allow air to pass through the second passageway 480 and to the oil tank 242 and vent 462 thereby venting the crankcase 18 to the air inlet line 454 (FIG. 20). The second check valve 506 remains closed until the average crankcase pressure is greater than the predetermined level. When the crankcase pressure is greater than the predetermined level, the pressure within the crankcase 18 acting against the valve member 516 overcomes the force of the biasing member 520 to lift the valve member 516 from the seat 514 to open the second valve 506.

In one construction, the biasing member 520 of the second check valve 506 is chosen such that the second check valve 506 opens when the average pressure within the crankcase is about 0.2 psi above ambient pressure. Of course in other constructions, the second check valve 506 can be designed to open at more or less than 0.2 psi.

The foregoing description of the present invention has been presented for purposes of illustration and description. Furthermore, the description is not intended to limit the invention in the form disclosed herein. Consequently, variations and modifications commensurate with the above teachings in skill or knowledge of the relevant art, are within the scope of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art. It is understood that the invention disclosed and defined herein extends to all alternative combinations of two or more of the individual features mentioned or evident from the text and/or drawings. All of these different combinations constitute various alternative aspects of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A two-cycle diesel engine for operating with high combustion chamber surface temperatures, the engine comprising:
    an aluminum engine block including at least one cylinder including a first intake port and a first exhaust port, the engine block including a first fluid flow channel for cooling the engine block and a second fluid flow channel located at the exhaust port to cool the portion of the cylinder proximate the exhaust port;
    a cylinder sleeve having a top end and a bottom end, and fabricated from a metal composite to include a second intake port and a second exhaust port proximate the bottom end, the sleeve being fastened to the interior of the cylinder with the intake ports being in fluid communication and the exhaust ports being in fluid communication;
    a head assembly engaged with the engine block, the head assembly including a third cooling fluid flow channel;
    a fuel injector assembly including an injector tip, the assembly supported by the head assembly, the injector assembly including a fuel flow channel between a fuel source and the injector tip, a return fuel channel between the injector tip and the fuel source and a cooling fuel channel between the injector tip and the fuel source ;
    a stainless steel fire plate resiliently supported between the top end of the cylinder sleeve and the head assembly to cooperate with the fuel injector assembly to close the top end of the cylinder sleeve;
    a crank shaft coupled to a connecting rod;
    an aluminum piston having a titanium alloy crown, the piston being located within the sleeve and connected to the connecting rod to move the crown between the top of the cylinder sleeve, and below the second intake and exhaust ports;
    a turbocharger including a turbine coupled to the exhaust ports and a compressor including an input coupled to an air filter and an output; and
    a supercharger including a compressor coupled to the compressor output and the intake ports.

2. The engine of claim 1, wherein the metal composite is an aluminum base material coated with steel.

3. The engine of claim 1, wherein the metal composite is a metal matrix material comprising:
    a base alloy comprising by weight of between 8.5-9.5% Si, a maximum of 0.2% Fe, a maximum of 0.2% Cu, a maximum of 0.2% Mn, between 0.45-0.65% Mg, a maximum of 0.1% Zn, a maximum of 0.2% Ti, a total maximum of 0.15% other matter with a maximum of 0.05% for any single other matter, and any remaining percentage being Al;
    SiC particulate; and
    Ni coated graphite;
    wherein the combined base alloy, SiC particulate , and Ni coated graphite are solution and precipitation heat treated.

4. The engine of claim 1, further comprising a wrist pin supported at its ends and center by the piston, wherein the end of the connecting rod includes a saddle which surrounds less than 180 degrees of the wrist pin and is fastened to the wrist pin.

5. The engine of claim 4, further comprising a sealing washer positioned between the stainless steel fire plate and the cylinder sleeve to provide a seal between the plate and sleeve.

6. The engine of claim 4, further comprising a deflected belleville spring positioned between the head assembly and the stainless steel fire plate.

7. The engine of claim 5, further comprising a deflected belleville spring positioned between the head assembly and the stainless steel fire plate to resiliently force the fire plate against the sealing washer and the sealing washer against the sleeve.

8. The engine of claim 6, wherein the second fluid flow channel includes a first branch passing over the top portion of the first exhaust port and a second branch passing under the bottom portion of the first exhaust port.

9. A two-cycle diesel engine for operating with high combustion chamber surface temperatures, the engine comprising:
    an aluminum engine block including at least four cylinders each including a first intake port and a first exhaust port, the engine block including a first fluid flow channel for cooling the engine block and a second fluid flow channel located at the exhaust ports to cool the portions of the cylinders proximate the exhaust ports;
    at least four cylinder sleeves each having a top end and a bottom end and fabricated from a metal composite to each include a second intake port and a second exhaust port proximate the bottom ends, the sleeves being fastened to the interior of a respective cylinder with the intake ports being in fluid communication and the exhaust ports being in fluid communication;
    at least four head assemblies engaged with the engine block, the head assemblies each including a third cooling fluid flow channel;
    at least four fuel injector assemblies each including an injector tip, the assemblies each supported by a respective head assembly, the injector assemblies each including a fuel flow channel between a fuel source and the injector tip, a return fuel channel between the injector tip and the fuel source and a cooling fuel channel between the injector tip and the fuel source;
    at least four stainless steel fire plates each resiliently supported between the top end of respective cylinder sleeves and the head assemblies to cooperate with the fuel injector assembly to close the top end of a respective cylinder sleeve;
    a crank shaft coupled to at least four connecting rods;
    at least four aluminum pistons each having a titanium alloy crown, the pistons being located within a respective sleeve and connected to a respective connecting rod to move the crown between the top of the cylinder sleeve, and below the second intake and exhaust ports;

a turbocharger including a turbine coupled to at least one of the exhaust ports and a compressor including an input coupled to an air filter and an output; and a supercharger including a compressor coupled to the output and at least one of the intake ports.

10. The engine of claim 9, wherein the metal composite is an aluminum base material coated with steel.

11. The engine of claim 9, wherein the metal composite is a metal matrix material comprising:

a base alloy comprising by weight of between 8.5-9.5% Si, a maximum of 0.2% Fe, a maximum of 0.2% Cu, a maximum of 0.2% Mn, between 0.45-0.65% Mg, a maximum of 0.1% Zn, a maximum of 0.2% Ti, a total maximum of 0.15% other matter with a maximum of 0.05% for any single other matter, and any remaining percentage being Al;

SiC particulate; and

Ni coated graphite;

wherein the combined base alloy, SiC particulate, and Ni coated graphite are solution and precipitation heat treated.

12. The engine of claim 9, further comprising a wrist pin supported at its ends and center by a respective piston, wherein the end of the connecting rods includes a saddle which surrounds less than 180 degrees of the respective wrist pin and is fastened to the respective wrist pin.

13. The engine of claim 12, further comprising a sealing washer positioned between each respective stainless steel fire plate and respective cylinder sleeve to provide a seal between the respective plates and sleeves.

14. The engine of claim 12, further comprising a deflected belleville spring positioned between respective head assemblies and the respective stainless steel fire plates.

15. The engine of claim 13, further comprising a deflected belleville spring positioned between respective head assemblies and the respective stainless steel fire plates to resiliently force the respective fire plates against the respective sealing washers and the sealing washers against the respective sleeves.

16. The engine of claim 14, wherein the second fluid flow channel includes a first branch passing over the top portion of the first exhaust port and a second branch passing under the bottom portion of the first exhaust port.

17. An engine unit comprising:

an engine block including at least one cylinder including a first intake port and a first exhaust port, the engine block including a first fluid flow channel for cooling the engine block and a second fluid flow channel located at the exhaust port to cool the portion of the cylinder proximate the exhaust port, the second fluid flow channel including a first branch passing over the top portion of the first exhaust port and a second branch passing under the bottom portion of the first exhaust port.

a cylinder sleeve having a top end and a bottom end, and fabricated from a metal composite to include a second intake port and a second exhaust port proximate the bottom end, the sleeve being fastened to the interior of the cylinder with the intake ports being in fluid communication and the exhaust ports being in fluid communication;

a head assembly engaged with the engine block, the head assembly including threads for engaging the head to the engine block and including a third cooling fluid flow channel;

a fuel injector assembly including an injector tip, the assembly supported by the head assembly, the injector assembly including a fuel flow channel between a fuel source and the injector tip, a return fuel channel between the injector tip and the fuel source and a cooling fuel channel between the injector tip and the fuel source;

a stainless steel fire plate;

a deflected belleville washer being located between the head assembly and the stainless steel fire plate;

a sealing washer being located between the stainless steel fire plate and the top end of the cylinder sleeve, the sealing washer, fire plate and fuel injector assembly being arranged to close the top end of the cylinder sleeve;

a crank shaft coupled to a connecting rod;

an aluminum piston having a titanium alloy crown, the piston being located within the sleeve and connected to the connecting rod to move the crown between the top of the cylinder sleeve, and below the second intake and exhaust ports;

a wrist pin supported at its ends and center by the piston, wherein the end of the connecting rod includes a saddle which surrounds less than 180 degrees of the wrist pin and is fastened to the wrist pin;

a turbocharger including a turbine coupled to the exhaust ports and a compressor including an input coupled to an air filter and an output; and a supercharger including a compressor coupled to the compressor output and the intake ports.

18. The unit of claim 17, wherein the metal composite is an aluminum base material coated with steel.

19. The unit of claim 18, wherein the metal composite is a metal matrix material comprising:

a base alloy comprising by weight of between 8.5-9.5% Si, a maximum of 0.2% Fe, a maximum of 0.2% Cu, a maximum of 0.2% Mn, between 0.45-0.65% Mg, a maximum of 0.1% Zn, a maximum of 0.2% Ti, a total maximum of 0.15% other matter with a maximum of 0.05% for any single other matter, and any remaining percentage being Al;

SiC particulate; and

Ni coated graphite;

wherein the combined base alloy, SiC particulate, and Ni coated graphite are solution and precipitation heat treated.

20. The unit of claim 17, further comprising:

a turbocharger including a turbine and compressor, the compressor coupled to an air inlet and a first air outlet;

an intercooler coupled to the air outlet, the intercooler including a second air outlet; and a supercharger coupled to the second air outlet and the intake ports.

* * * * *